United States Patent
Schneidewend et al.

(10) Patent No.: US 12,338,114 B2
(45) Date of Patent: Jun. 24, 2025

(54) HOME WATER-BASED DRINK FORMULATING SYSTEM

(71) Applicant: CULLIGAN INTERNATIONAL COMPANY, Rosemont, IL (US)

(72) Inventors: Tedd Schneidewend, Glen Ellyn, IL (US); Adam Sloma, Arlington Heights, IL (US); Christopher Gail Harris, Chicago, IL (US); Kenneth Reed, Kenosha, WI (US)

(73) Assignee: CULLIGAN INTERNATIONAL COMPANY, Rosemont, IL (US)

( * ) Notice: Subject to any disclaimer, the term of this patent is extended or adjusted under 35 U.S.C. 154(b) by 1139 days.

(21) Appl. No.: 16/526,775

(22) Filed: Jul. 30, 2019

(65) Prior Publication Data

US 2020/0031651 A1 Jan. 30, 2020

Related U.S. Application Data

(60) Provisional application No. 62/711,817, filed on Jul. 30, 2018.

(51) Int. Cl.
*B67D 1/00* (2006.01)
*A47J 31/40* (2006.01)
(Continued)

(52) U.S. Cl.
CPC .......... *B67D 1/0021* (2013.01); *A47J 31/407* (2013.01); *A47J 31/461* (2018.08); *B67D 1/0078* (2013.01);
(Continued)

(58) Field of Classification Search
CPC .......... C02F 2209/445; C02F 2209/006; C02F 2209/008; C02F 2209/04; C02F 2209/06;
(Continued)

(56) References Cited

U.S. PATENT DOCUMENTS 3,536,097 A 10/1970 Caparone et al.
4,997,553 A 3/1991 Clack
(Continued)

FOREIGN PATENT DOCUMENTS

KR 101155341 B1 6/2012
KR 2015-0068170 A 6/2015
(Continued)

OTHER PUBLICATIONS

The Mineral Content of US Drinking and Municipal Water, Pehrsson, 1 page, Feb. 2017. (Year: 2017).*
(Continued)

*Primary Examiner* — Magali P Slawski
*Assistant Examiner* — Bernadette Karen McGann
(74) *Attorney, Agent, or Firm* — Greer, Burns & Crain, Ltd

(57) ABSTRACT

A drink formulating system includes a housing having a housing outlet, a receiving tank receiving water poured by a user, and a pump being configured for pumping water from the receiving tank. A first filter is in fluid communication with the pump for removing a first set of substances from the water. A second filter removes a second set of substances different from the first set of substances from the water obtained from the receiving tank. A second filter outlet is connected to an additive module having at least two additive cartridges, each cartridge supplying a designated composition of potable nutrients. A user-controlled interface allows for user selection of one of the designated nutrient compositions, which are then pumped into water from the chilling tank and distributed from the housing outlet.

20 Claims, 15 Drawing Sheets

(51) Int. Cl.
   *A47J 31/46* (2006.01)
   *B67D 1/08* (2006.01)
   *C02F 1/28* (2023.01)
   *C02F 1/42* (2023.01)
   *C02F 1/44* (2023.01)
   *C02F 1/68* (2023.01)
   *C02F 9/20* (2023.01)

(52) U.S. Cl.
   CPC .............. *B67D 1/0888* (2013.01); *C02F 9/20* (2023.01); *B67D 2210/0001* (2013.01); *B67D 2210/00104* (2013.01); *C02F 1/283* (2013.01); *C02F 1/42* (2013.01); *C02F 1/441* (2013.01); *C02F 1/68* (2013.01); *C02F 2201/006* (2013.01); *C02F 2209/445* (2013.01); *C02F 2307/10* (2013.01)

(58) Field of Classification Search
   CPC .............. C02F 2209/07; C02F 2209/29; C02F 2307/10; C02F 1/28; C02F 1/283; C02F 1/42; C02F 1/422; C02F 1/425; C02F 1/003; C02F 1/66; C02F 1/427; C02F 1/441; C02F 1/68; C02F 1/686; C02F 2201/006; C02F 2201/009; C02F 2201/002; C02F 9/005; C02F 2103/42; B67D 1/0021; B67D 2210/0001; B67D 2201/00104; B67D 1/0078; B67D 1/0888; A47J 31/461; A47J 31/407; G01N 31/22; G08B 5/22; G08B 5/225; F25B 37/00
   See application file for complete search history.

(56) References Cited

U.S. PATENT DOCUMENTS

| | | | |
|---|---|---|---|
| 5,064,097 A | 11/1991 | Brog et al. | |
| 5,205,318 A | 4/1993 | Massaro et al. | |
| 5,388,287 A | 2/1995 | Tischler et al. | |
| 5,889,684 A | 3/1999 | Ben-David et al. | |
| 6,058,718 A * | 5/2000 | Forsberg | E03B 3/28 62/150 |
| 6,138,995 A | 10/2000 | Page | |
| 6,358,395 B1 | 3/2002 | Schorzman et al. | |
| 6,684,648 B2 | 2/2004 | Faqih | |
| 7,080,525 B2 | 7/2006 | McCann et al. | |
| 7,378,015 B2 | 5/2008 | Rinker et al. | |
| 7,861,550 B2 | 1/2011 | Knoll et al. | |
| 8,047,401 B2 | 11/2011 | Holler | |
| 8,252,171 B2 | 8/2012 | Doran | |
| 8,276,787 B1 | 10/2012 | Gremillion et al. | |
| 8,365,959 B2 | 2/2013 | Tavolazzi | |
| 8,499,978 B2 | 8/2013 | Dalchau et al. | |
| 8,701,437 B2 | 4/2014 | Choi | |
| 8,741,148 B2 | 6/2014 | Park et al. | |
| 8,808,775 B2 | 8/2014 | Novak et al. | |
| 9,085,450 B2 | 7/2015 | Forte | |
| 9,085,879 B2 | 7/2015 | Mielke et al. | |
| 9,114,368 B2 | 8/2015 | Njaastad et al. | |
| 9,233,824 B2 | 1/2016 | Kirschner et al. | |
| 9,243,387 B2 | 1/2016 | Forte et al. | |
| 9,309,103 B2 | 4/2016 | Ergican et al. | |
| 9,309,135 B2 | 4/2016 | Sigona | |
| 9,327,956 B2 | 5/2016 | Forte | |
| 9,370,273 B2 | 6/2016 | Li et al. | |
| 9,409,758 B2 | 8/2016 | McHale et al. | |
| 9,409,759 B2 | 8/2016 | Wilder et al. | |
| 9,604,861 B2 | 3/2017 | Zhang | |
| 9,630,826 B2 | 4/2017 | Green et al. | |
| 9,816,751 B2 | 11/2017 | Mackey et al. | |
| 9,957,145 B2 | 5/2018 | Cohen et al. | |
| 10,031,533 B2 | 7/2018 | Jeong et al. | |
| 10,829,359 B2 * | 11/2020 | von Kraus | B67D 1/0074 |
| 2003/0019764 A1 | 1/2003 | Baldwin et al. | |
| 2004/0206244 A1 | 10/2004 | Spiegel et al. | |
| 2005/0133420 A1 | 6/2005 | Rinker et al. | |
| 2006/0006107 A1 | 1/2006 | Olson et al. | |
| 2007/0084771 A1 | 4/2007 | Watanabe et al. | |
| 2008/0022694 A1 * | 1/2008 | Anderson | B01D 5/009 62/3.4 |
| 2008/0060943 A1 | 3/2008 | Zimmermann | |
| 2009/0283464 A1 * | 11/2009 | Oe | E03B 1/02 62/271 |
| 2011/0100890 A1 | 5/2011 | Brotman | |
| 2011/0320134 A1 | 12/2011 | Butler et al. | |
| 2013/0098814 A1 | 4/2013 | Kelly et al. | |
| 2014/0263406 A1 | 9/2014 | Green et al. | |
| 2014/0331868 A1 | 11/2014 | Novak et al. | |
| 2015/0024088 A1 | 1/2015 | Cohen et al. | |
| 2015/0069088 A1 * | 3/2015 | Olson | B67D 1/10 222/129.1 |
| 2015/0125586 A1 | 5/2015 | Ergican | |
| 2015/0251922 A1 | 9/2015 | Schuster | |
| 2015/0259218 A1 | 9/2015 | Ergican et al. | |
| 2016/0009539 A1 | 1/2016 | Jersey et al. | |
| 2016/0095464 A1 | 4/2016 | Jones | |
| 2016/0101447 A1 | 4/2016 | Forte et al. | |
| 2016/0106136 A1 | 4/2016 | Gordon et al. | |
| 2016/0109165 A1 | 4/2016 | Mackey et al. | |
| 2016/0325980 A1 | 11/2016 | Sawhney et al. | |
| 2016/0340207 A1 | 11/2016 | Schuster | |
| 2017/0088410 A1 | 3/2017 | Wing et al. | |
| 2017/0292253 A1 | 10/2017 | Chen | |
| 2017/0327366 A1 | 11/2017 | Morales Urquiza | |
| 2018/0002153 A1 | 1/2018 | Kim et al. | |
| 2018/0154310 A1 * | 6/2018 | Huang | B01D 61/025 |
| 2018/0186655 A1 | 7/2018 | Cobb et al. | |
| 2018/0244541 A1 | 8/2018 | Pirutin | |
| 2018/0313068 A1 | 11/2018 | Hirsch | |
| 2020/0031654 A1 * | 1/2020 | Wing | F25D 31/003 |

FOREIGN PATENT DOCUMENTS

| | | | |
|---|---|---|---|
| WO | WO2007001489 A2 * | 1/2007 | |
| WO | WO-2012019922 A1 * | 2/2012 | A47J 31/402 |

OTHER PUBLICATIONS

WayBackMachine Internet Archives from The Mineral Content of US Drinking and Municipal Water—publication date of Feb. 2017; 1 page. (Year: 2017).*
International Search Report from corresponding International Patent Application No. PCT/US2019/044188, mailed Oct. 24, 2019.

* cited by examiner

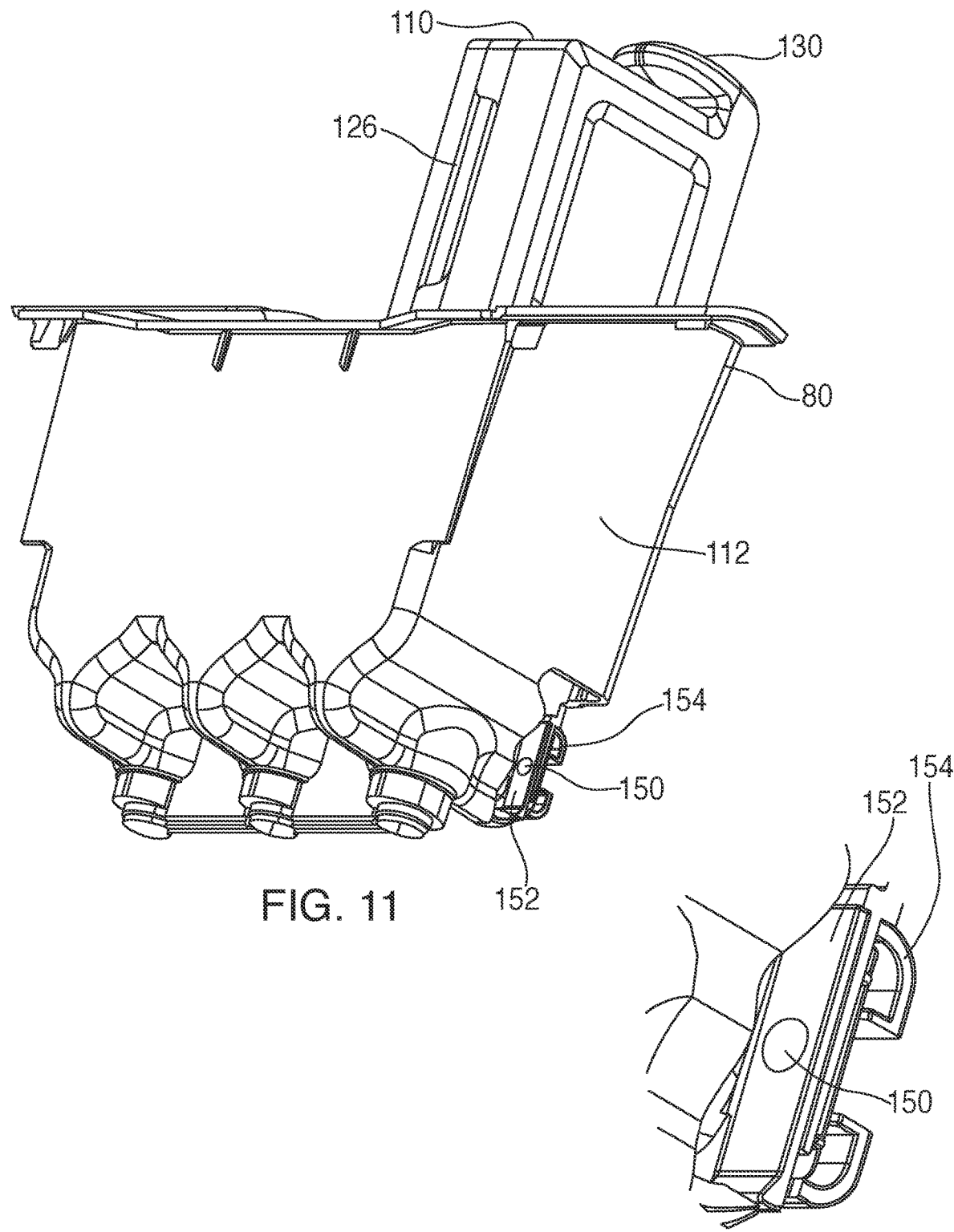

HOME WATER-BASED DRINK FORMULATING SYSTEM

RELATED APPLICATION

This application claims 35 USC 119 Priority from U.S. Provisional Application Ser. No. 62/711,817 filed Jul. 30, 2018, which is incorporated by reference.

BACKGROUND

The present invention relates generally to residential water treatment and drink formulation systems, and more specifically to a system constructed and arranged for enabling user-selected alteration of the composition and/or taste of filtered drinking water.

It is well known that drinking significant amounts of water is good for the health. Also, there is increasing concern about the integrity of the nation's municipal water treatment systems, and whether common tap water is always safe to drink. A result of these and other factors is that the popularity of bottled spring and treated water has increased steadily over the past several years.

One drawback of excessively filtered drinking water is that the minerals needed for good taste are often removed in the filtration process, requiring their reintroduction during the bottling procedure. The amount and nature of such mineral addition is subjective and varies by manufacturer. Another drawback of the ever more popular extensive consumption of bottled water is the tremendous amount of waste generated by discarded plastic bottles.

A product of the above factors is an increased demand for home water treatment systems. Such systems range from basic filter pitchers with replaceable activated carbon-filled cartridges, to faucet-mounted filter units with replaceable cartridges, to plumbed systems with dedicated faucets and periodically replaceable cartridges. A disadvantage of these systems is that, while the treated water has a consistent taste and composition, the mineral content of the treated water cannot be modified by the user.

Home drink formulation systems are also known, where hot drinks such as coffee or tea are brewed in a counter-top machine using individual cartridges available in a wide variety of flavors. While very convenient and easy for users to obtain drinks that satisfy individual tastes, these systems are often relatively costly, and have been criticized for the generation of excessive waste in the form of discarded, individual dose cartridges. Also, the principles of such systems have not been transferred to systems delivering filtered water. Home soft drink formulation systems are also known.

In view of the above considerations, there is a need for an improved home drink system that provides users the ability to choose the type of water they are drinking without generating excessive cartridge waste.

SUMMARY

The above-listed need is met or exceeded by the present home water-based drink formulating system. In a preferred embodiment, the present system is a counter-top filter device that filters an extensive amount of impurities, minerals from the water down to levels of at or near zero. Other locations besides a counter-top are contemplated, including but not limited to cabinet mounting, or under counter mounting. Using the pure filtered water, the device introduces vitamins and minerals to specific levels for added health benefits. In addition, in one embodiment, the device has a refrigeration system that chills the filtered water so the user does not have to waste space in their refrigerator for this purpose. Using a simple user interface, the user quickly selects between the type of water desired and visually monitors the system as it functions.

Another feature of the present system is that the machine or device is easily serviced by the user. In the preferred embodiment, there are two water filters on the device, each having a designated cartridge. One cartridge is replaced once per year, and the other is replaced about every 3-4 months. In addition to the filter cartridges, there are multiple enhancement pouches or cartridges, each configured for delivering about 80 drinks each, which are also easily replaced by the user at designated locations in the machine housing.

For the consumer who wants high quality filtered water at their fingertips with added benefits and enhancements, the present system provides the convenience of bottled water without the waste or cost, the quality of an under-sink filtration system without the installation obstacles, and the ability to customize drinking water by adding vitamins/nutrients found in enhanced water or sports drinks without the sugar and artificial additives.

Examples of the types of users who benefit from the present system include the athlete or health conscious individual that needs to replace what was lost after a workout or run, and values the benefits of better water but doesn't want the preservatives, artificial additives and sugar found in sports drinks. Another user is the family running to a soccer game or the active couple that is going for a bike ride, needing to fill their water bottles before heading out. They prefer not to buy bottled water due to the waste, but are aware of the benefits of filtered water. Yet another target user is the parent who values quality water and wants to take every opportunity to provide extra vitamins/nutrients to themselves and their children as they grow and develop.

More specifically, a drink formulating system is provided, including a housing having a housing outlet, a receiving tank associated with the housing and being accessible to receive water poured by a user, and a pump associated with the housing and being configured for pumping water from the receiving tank. A first filter is associated with the housing and is in fluid communication with the pump, the first filter configured for removing a first set of substances from the water obtained from the receiving tank.

A second filter is associated with the housing and is in fluid communication with the first filter so that water treated by the first filter is passed to the second filter, the second filter is constructed and arranged for removing a second set of substances different from the first set of substances from the water obtained from the receiving tank.

A refrigerated chilling tank is preferably associated with the housing and has an inlet being accessible to receive water filtered by the second filter. A refrigeration system is optionally associated with the housing and is constructed and arranged for chilling water in the chilling tank. An outlet of the chilling tank is connected to an additive module having at least two additive cartridges, each cartridge supplying a designated composition of potable nutrients. A user-controlled interface is connected to the additive module and configured for user selection of one of the designated compositions of nutrients, which are then pumped or otherwise dosed into optionally filtered water sourced from the chilling tank and distributed from the housing outlet for user consumption.

In one embodiment, the first filter is constructed and arranged as a deionizing filter (DI) for removing salts and minerals from the water in the receiving tank, and is provided with a supply of ion exchange resin beads for withdrawing charged particles and minerals from the water. In an embodiment, the second filter is constructed and arranged as a Submicron carbon filter for removing heavy metals, VOCs, chlorine, taste, odor, particulates, pharmaceuticals and microbial contaminants from the water in the receiving tank which has been treated by the first filter. After treatment by the second filter, the water has a Total Dissolved Solids (TDS) value of approximately 0.

In one embodiment, one of the additive cartridges is formulated for Sport Drink enhancement, and includes effective amounts of elements taken from the group consisting of calcium, sodium, potassium, magnesium and Vitamin C, with a preferred concentration of the elements of 2000 ppm. Another of the additive cartridges is formulated for Antioxidant enhancement, and includes effective amounts of elements taken from the group consisting of Vitamin C, Vitamin E, Vitamin D, Calcium, Magnesium, tea extract, potassium, and polyphenol, with a concentration of the elements of approximately 1500 ppm. Still another of the additive cartridges is formulated for Mineral enhancement, and includes effective amounts of elements taken from the group consisting of calcium, potassium and magnesium, at a concentration of the elements in the cartridge of approximately 200 ppm.

Preferred hardware in the system includes at least one sensor operatively connected to components of the system and to the user interface for sensing at least one of receiving tank level, refrigeration tank temperature, water conductivity, refrigeration tank level and water flow rate. In addition, at least one solenoid valve is connected to the user interface for directing water flow in the system. A micro peristaltic dosing pump is preferably provided in the additive module, associated with each additive cartridge and connected to the user interface for providing designated amounts of additive to the water dispensed from the housing outlet. Each dosing pump preferably operates to achieve a dosing ratio of the additive elements in the additive cartridge to the receiving water flow of from 1:200 to 1:50.

Another feature is that the user interface (UI) has functions for the user to monitor and/or control water temperature, working life of the first and second filters, water level in the chilled tank, water level in the receiving tank, a selected additive cartridge, working life of the additive cartridge or that the additive cartridges are bypassed.

In another embodiment, a drink formulating system includes a housing having a housing outlet, a receiving tank associated with the housing and receiving water poured by a user, a pump associated with the housing and being configured for pumping water from the receiving tank. At least one filter is in fluid communication with the pump for removing a first set of substances from the water. An additive module is connected to an outlet of the at least one filter and has at least two additive cartridges, each cartridge supplying a designated composition of potable nutrients. A user-controlled interface allows for user selection of one of the designated nutrient compositions, which are then pumped or otherwise dosed into water from the chilling tank and distributed from the housing outlet.

The at least one filter is contemplated as being one of an activated carbon filter or a Reverse Osmosis (RO) unit. A chilling unit is optionally provided for chilling the water prior to sending the water to the additive module.

In an embodiment, the additive cartridge is provided in the form of a rigid cassette which is removably mounted in a designated receptacle in an additive module located in the housing. Having a hinged or clam-shell configuration, the cassette is easily openable by the user and accommodates a disposable additive pouch made of a flexible material and including a rigid outlet or spout. An outlet formation on the cassette clamps and locks the spout in place and enhances alignment of the spout with an intake port in the receptacle. Once the pouch is enclosed in the cassette and the spout locked in place at the outlet, the cassette is prevented from rotating in the cassette. The rigid construction of the cassette prevents unwanted squeezing of the pouch, and allows for free flow of pouch contents into the treated water supply.

In one embodiment, magnets in opposing locations on opposing clamshell halves of the cassette are used to hold the cassette in a closed position. It is also preferred for the cassette and the corresponding receptacle to emit a tactile and/or audible indication that the cassette is properly seated in the additive module.

Optionally, the cassette is equipped with an RFID tag that interacts wirelessly with a control system in the housing to monitor the working life of the pouch, indicate when the pouch is empty, and/or indicates that the cassette is in the designated receptacle in the additive module.

Another feature of the present drink formulating system which is especially applicable when provided in a countertop configuration, is that the additive cassettes are engageable in the designated receptacles at a desired inclined angular orientation that facilitates insertion/removal of the cassettes from the additive module, especially when the housing is placed partly under a shelf or cabinets on the counter-top. In a preferred embodiment, the angle of orientation is generally in the range of 60-70°. In a further preferred embodiment, the angle of orientation is 62.5°.

To facilitate proper engagement and alignment of the cassettes in the designated receptacles, a mating configuration is preferably provided with corresponding ribs and grooves or similar structures on opposing surfaces of the cassette and the receptacle. In the preferred embodiment, the receptacle has grooves and the cassette has mating ribs, however a reverse orientation is contemplated depending on the application.

It is also contemplated for the additive pouches to be packaged in transparent foil or similar material that permits the user to see the additive level remaining in the pouch. For such applications, the cassette is provided with an elongate slot along one side that allows the user to see the content level of the pouch through the cassette. In many embodiments, this slot is also used as a gripping point to facilitate opening of the cassette by the user to exchange pouches.

Another feature of the present drink additive system is that the user interface (UI) employs illuminated icons, including a shape indicative of the function of the icon, for example a "heart" shape being indicative of a health additive, and the shape icon being surrounded by a plurality of secondary icons such as a ring of spaced, illuminated arcs. The illumination of the arcs, as well as of the icon itself is indicative of the level of additive in the respective pouch. As the additive is depleted, the color of each of the arcs sequentially dims, until each arc is no longer visible. When the pouch is almost empty, in the preferred embodiment, the central or main icon turns yellow, then red, acting as an alarm for the user to replace the pouch. Optionally, the arcs are replaced by a line of illuminated level markers in spaced parallel arrangement, visible on a display screen. As the pouch is depleted, the number of visible icons is reduced until the pouch is empty, at which time none of the markers are visible. Similar icons are contemplated for displaying the life of the carbon filter cartridge.

In addition, the UI preferably includes a TDS IN and TDS OUT display to indicate to the user the need to change the deionization (DI) filter cartridge. TDS IN refers to the TDS of the incoming untreated water, and TDS OUT refers to the TDS of the water after treatment by the present system. Once the TDS OUT exceeds a preset level, for example 30 ppm, which may vary to suit the application, the UI displays an alarm icon, such as a flashing TDS OUT, and/or an additional display such as CHG, indicating to the user to change the DI filter cartridge.

Another feature of the present drink formulating system is that it is important to ensure that Total Dissolved Solids (TDS) is significantly reduced to at or near 0 at the end of the DI filtration step. A range of 0-10 ppm TDS is considered acceptable. To this end, a first TDS sensor or probe is located in the water line just upstream of the first filter and measures the initial TDS of the incoming, untreated water. A second TDS sensor or probe is located after the first filter (DI) of the two filters (DI and carbon) and is constructed and arranged to confirm that significantly reduced to at or near 0 TDS has been achieved in the filtering process. As a further quality control step, a third TDS sensor or probe is preferably placed downstream of the last additive cassette location. This third TDS sensor or probe confirms that TDS has reached the desired levels after addition of the additives. In one embodiment, the control system is programmed to compute the difference between the second and third TDS meter readings, and confirm that the treated water has the desired TDS level. Advantages of the quality control aspect of the third TDS sensor include detection of the use of a foreign additive pouch, the additive pouch is incorrectly mounted in the system, the additive pouch is out of specification, and or is depleted and is no longer altering the water.

In one embodiment of the present drink formulating system, the control unit adjusts additive flow rate as a function of water flow rate, to maintain a desired concentration of additive in the treated water.

Another feature of the present drink formulating system is that a receiving tank that stores water prior to filtering has a level switch that is configured to monitor when the tank is virtually empty. As such, the level switch includes a notched cradle fixed near a floor of the tank. A float element is dimensioned to matingly nest in the cradle so that when nested the element is only slightly above the tank floor.

In an embodiment, the receiving tank is releasably locked in the housing so that a housing inlet, that engages a check valve in the tank, is oriented above a drip tray so that any water that leaks from the inlet or the check valve upon disengagement of the receiving tank is caught by the drip tray. An associated feature is that the housing features a tactile and/or audible locking system that alerts the user that the receiving tank is properly located in the system housing. In the preferred embodiment, this feature is achieved using spring-balls on at least one and preferably both sides of the receiving tank.

BRIEF DESCRIPTION OF THE DRAWINGS

FIG. 11 is a bottom perspective view of the insertion of the additive cartridge into the housing;

FIG. 12 is an enlarged fragmentary view of the structure of FIG. 11;

DETAILED DESCRIPTION

Figure 1:
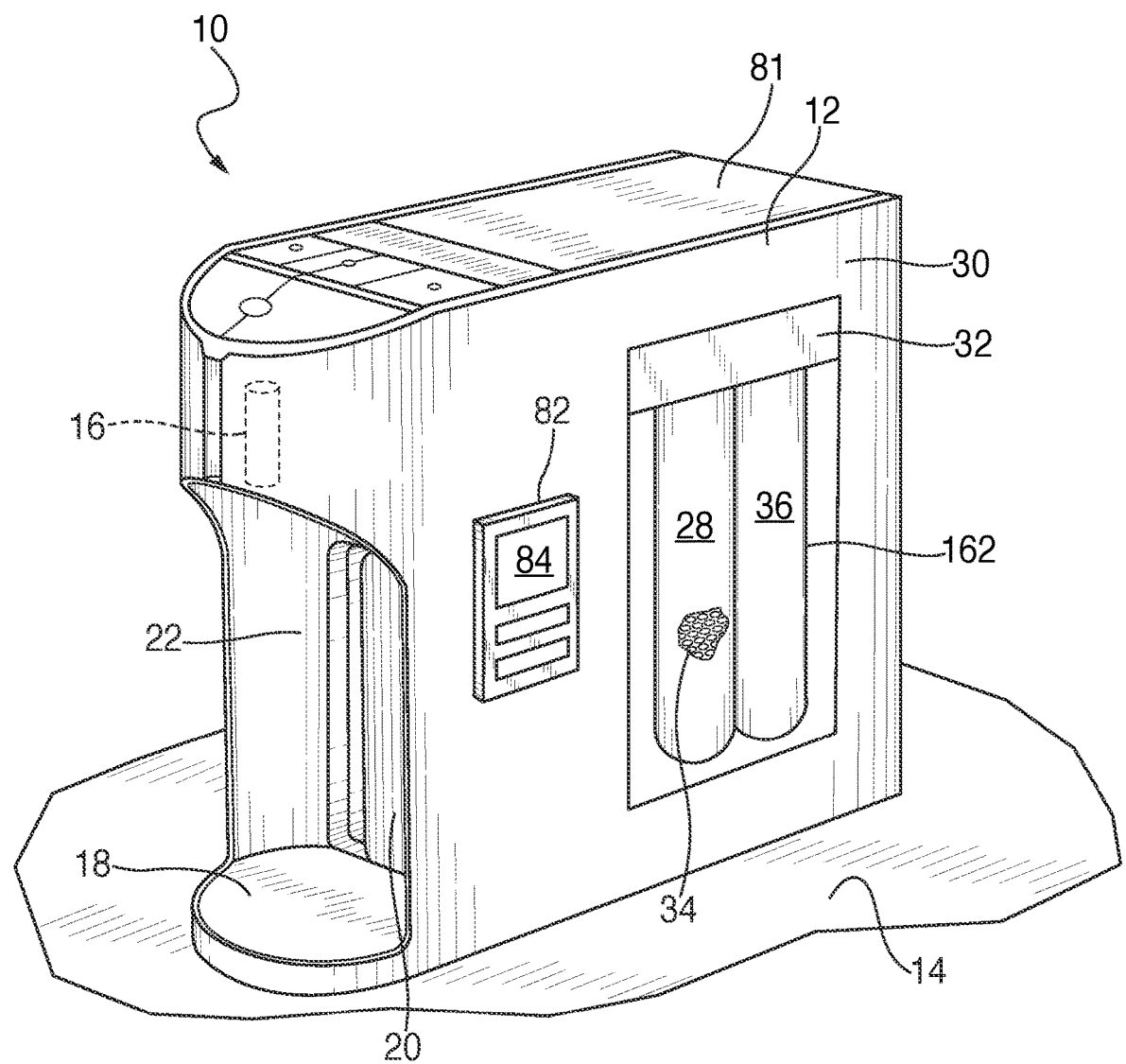
FIG. 1 is a top perspective view of the present drink formulating system located on a countertop.
Figure 2:
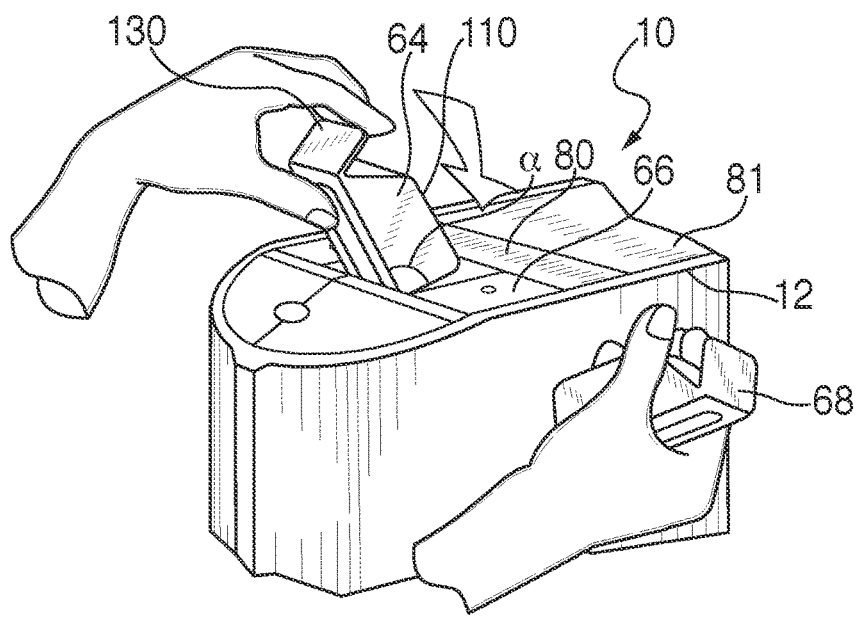
FIG. 2 is an enlarged, fragmentary top perspective view of the system of FIG. 1 showing the insertion of additive cartridges.

Referring now to FIGS. 1 and 2, the present water treatment and drink formulation system is generally designated 10, and is preferably embodied in a housing 12 which is constructed and preferably arranged for placement upon a conventional counter-top 14 in a kitchen, work room or the like. Other locations, including but not limited to under counter or in cabinet mounting are contemplated. In the present application, reference will be made to parts "associated with" the housing 12. This refers to parts being located within, on a side, top, front, rear or other surface, or otherwise movable with the housing on the countertop. One of the features of the present system 10 is that all of the functions of water treatment and drink formulation occur within or on the housing 12. In addition, the treated, preferably chilled and formulated output water is dispensed from the housing 12 through a housing outlet 16 (shown hidden in FIG. 1 also in FIG. 5), which fills drinking containers such as glasses or water bottles (not shown) which are placed on a filling platform 18.

A user-fillable receiving tank or container 20 is slidably locatable in a chamber or cavity 22 in the housing 12. The receiving tank 20 is removable by the user and Tillable at a tap or other water dispensing fixture, or receives water from bottles or jugs. A pump 24 (FIG. 5) with an associated pump inlet 26, also associated with the housing 12, draws water from the receiving tank 20 and forwards the water to a first filter 28. Preferably located on a side 30 of the housing 12, however other locations are contemplated, the first filter 28 is provided in the form of a removable cartridge connected to a manifold or head 32 and being in fluid communication with the pump 24. In the preferred embodiment, the first filter 28 is configured for removing a first set of substances from the water obtained from the receiving tank 20. In a preferred embodiment, the first set of substances are charged particles, including but not limited to salts and minerals, and the first filter is a deionizing filter (DI) having a supply of ion exchange resin beads 34. It is also contemplated that the first filter 28 is one of an activated carbon filter or a Reverse Osmosis (RO) unit as is well known in the art. Such a filter 28 is contemplated in one embodiment as being the sole filter in the system 10.

In line and in fluid communication downstream of the first filter 28 is a second filter 36 associated with the housing 12 so that water treated by the first filter is passed to the second filter. Like the first filter 28, the second filter 36 is provided as a removable cartridge, is connected to the filter head or manifold 32 and is constructed and arranged for removing a second set of substances different from the first set of substances from the water obtained from the receiving tank 20.

Preferably, the second filter 36 is constructed and arranged as a submicron carbon filter for removing heavy metals, volatile organic compounds (VOCs), chlorine, taste, odor, particulates, pharmaceuticals and microbial contaminants from the water sourced from the receiving tank 20 which has been treated by the first filter 28. It is also preferred, that after treatment by the second filter 36 the water has a Total Dissolved Solids (TDS) value of near 0. A range of 0-10 ppm TDS is considered acceptable.

Figure 5:
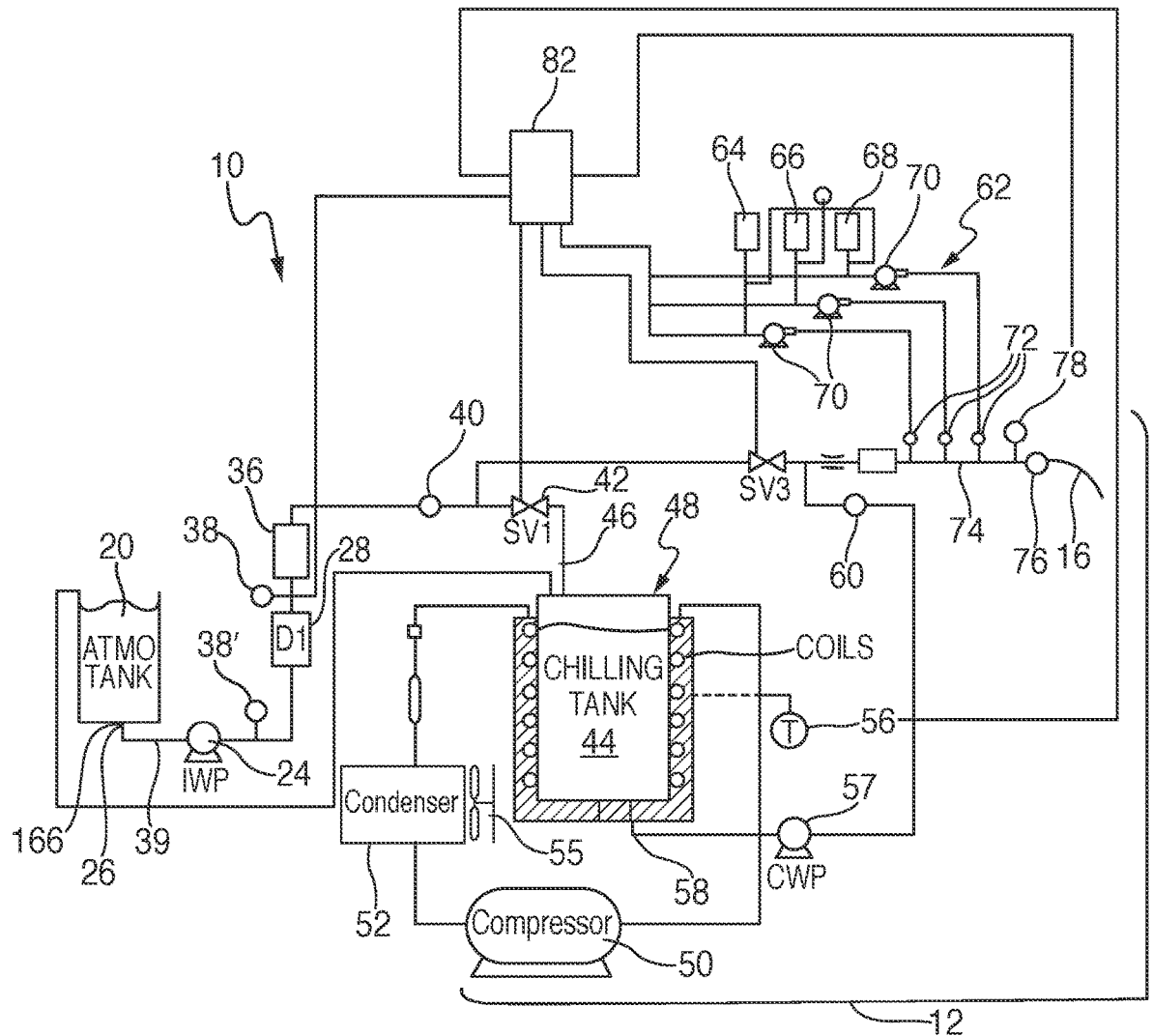
FIG. 5 is a schematic diagram of the system of FIG. 1.

Referring now to FIG. 5, a second TDS probe or sensor 38 monitors the water passing from the second filter 36. While other locations are contemplated, it is preferred that the second TDS sensor 38 is located in the water line between the first filter 28 and the second filter 36. The TDS level is optionally compared with data from a prefilters TDS sensor 38'. After passing through a check valve 40, in a preferred embodiment, the filtered water is directed, using a chill tank solenoid valve 42, into an optional refrigerated chilling tank 44 associated with, and preferably located within the housing 12 and having an inlet 46 being accessible to receive water filtered by the second filter 36. Additional sensors are contemplated for monitoring water temperature, water level and water flow related to the chilling tank 44. If provided, it is contemplated that the location of the chilling tank 44 in or about the housing 12 may vary to suit the application.

A refrigeration system, generally designated 48 is associated with and located within the housing 12, and is constructed and arranged for chilling water in the chilling tank 44. Using conventional technology, which may vary to suit the situation, the refrigeration system 48 preferably includes a compressor 50, a condenser 52, chilling coils 54 and a cooling fan 55. A temperature sensor 56 monitors in-tank water temperature to maintain the desired temperature, which is selected by the user, as discussed below.

Referring now to FIGS. 2 and 5, once the water is sufficiently chilled, a chilled water pump 57 is connected to an outlet 58 of the chilling tank 44 and pumps the filtered, chilled water through a check valve 60 to an additive module, generally designated 62. In embodiments where the chilling tank 44 and the refrigeration system 48 are not provided, the additive module 62 is connected to an outlet of the first or second filter 28, 36, whichever is closer in fluid flow (downstream) to the additive module 62. The additive module 62 includes at least two and preferably three additive cartridges 64, 66, 68, each cartridge supplying a designated, distinct and individualized composition of potable nutrients in concentrate form. Upon selection of the appropriate cartridge 64, 66, 68, filtered, chilled water will be passed through the cartridge and appropriately diluted for a satisfying drink.

It is contemplated that the additive cartridges 64, 66, 68 provide a range of nutrients and other healthful elements in varying amounts for various purposes and for targeted consumer groups. For example, one of the additive cartridges 64 is formulated for Sport Drink Enhancement, and includes effective amounts of elements taken from the group consisting of calcium, sodium, potassium, magnesium and Vitamin C. In a preferred embodiment, a concentration of the elements in the additive cartridge 64 is such that the resulting beverage has an additive concentration of approximately 2000 ppm.

Another of the additive cartridges 66 is preferably formulated for Antioxidant Enhancement, and includes effective amounts of elements taken from the group consisting of Vitamin C, Vitamin E, Vitamin D, Calcium, Magnesium, tea extract, potassium, and polyphenol. A concentration of the elements in the cartridge 66 is such that the resulting beverage has an additive concentration of approximately 1500 ppm. Still another of the additive cartridges 68 is preferably formulated for Mineral Enhancement, and includes effective amounts of elements taken from the group consisting of calcium, potassium and magnesium, with a preferred concentration of the elements in the cartridge 68 is such that the resulting beverage has an additive concentration of approximately 200 ppm. It is contemplated that a suitable additive cartridge 66 has a 250 ml capacity, and provides 75 drink servings from the housing outlet 16. The size and/or volume of the additive cartridges is contemplated as being variable to suit the application.

Referring now to FIG. 5, the additive module 62 further includes a dosing pump 70, more preferably a micro peristaltic dosing pump connected to and associated with each additive cartridge 64, 66, 68 for proper administration of additive elements from the desired cartridge and into the filtered, optionally chilled water. It is preferred that each dosing pump 70 operates to achieve a dosing ratio of the additive elements in the additive cartridge to the receiving water flow of from 1:200 to 1:50. Each of the pumps 70 is associated with a corresponding check valve 72 which is in fluid communication with a system outlet line 74. The outlet line 74 is in fluid communication with a system check valve 76 and is ultimately in fluid communication with the housing outlet 16. A suitable sensor 78 is located upstream of the system check valve 76 for monitoring at least one of TDS, water conductivity, refrigeration tank level, refrigeration tank temperature, water temperature, water flow volume and water flow rate.

Referring again to FIG. 2, the housing 12 is preferably configured with at least one recess 80, preferably in an upper surface 81, which is constructed and arranged for releasably receiving and accommodating each of the additive cartridges 64, 66, 68 in a push-in or snap-fit arrangement. Thus, the user readily exchanges the cartridges 64, 66, 68 when expired, for example after about 80 drink servings, or otherwise, depending on the application. Alternately, the cartridges 64, 66, 68 are exchangeable with other such cartridges having other mineral or additive element properties.

Figure 3:
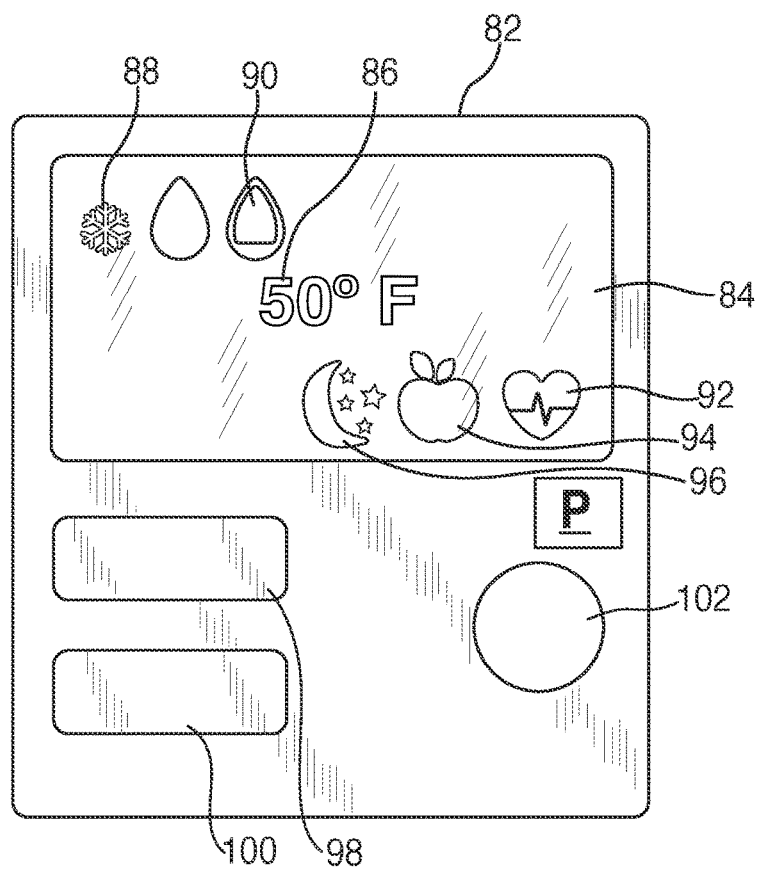
FIG. 3 is a front elevation of a user interface of the present system.

Referring now to FIGS. 1 and 3, the system 10 further includes a user-controlled graphic interface (UI) 82 preferably associated with the housing 12 and electrically connected to the additive module 62. Performing several functions, the interface 82 serves as a system status identifier and user control panel. As such, the interface 82 preferably includes a programmable processor P (FIG. 3) which includes executable, non-transitory instructions stored thereon, or is encoded with executable hardware/(non-transitory) software/firmware instructions. The connection between the interface 82 and the sensors 38, 78 and the additive module, particularly the dosing pumps 70 is contemplated as being wired or wireless. Such system monitoring and control systems are well known to those of ordinary skill in the art.

The sensors 38, 38', 78 as well as others, as well as the dosing pumps 70 and solenoid valves 42 are connected to the interface 82. A display 84 graphically provides various indicia or icons representing the status of the water temperature 86, operation of the chilling or refrigeration tank 88, water level in the chilling tank 90 as well as the selected one of the additive cartridges 92, 94, 96. Icons for the working life of at least one of the additive cartridges 92, 94, 96 are contemplated. User pressure on the appropriate icon 92, 94, 96 will activate the respective dosing pump 70 and the filtered, chilled water which has passed through the designated additive cartridge is then pumped or otherwise dosed into water sourced from said chilling tank and distributed from the housing outlet 16 for providing a drink with desired mineral or other additive elements on demand.

Furthermore, display fields are provided 98, 100, 102 for indicating other properties, including but not limited to flow rate, when to change the filters, water quality, the amount remaining in enhancement cartridges, amount remaining in the receiving tank 20, the amount remaining in the chilling tank 44, and troubleshooting procedures, among other functions. The interaction with the interface 82 is contemplated as being either by physical buttons or touch pads, as are well known in the art. If desired, the user has the opportunity to opt for water that has been filtered and chilled only, or just filtered, without addition of any of the additive cartridges.

Figure 4:
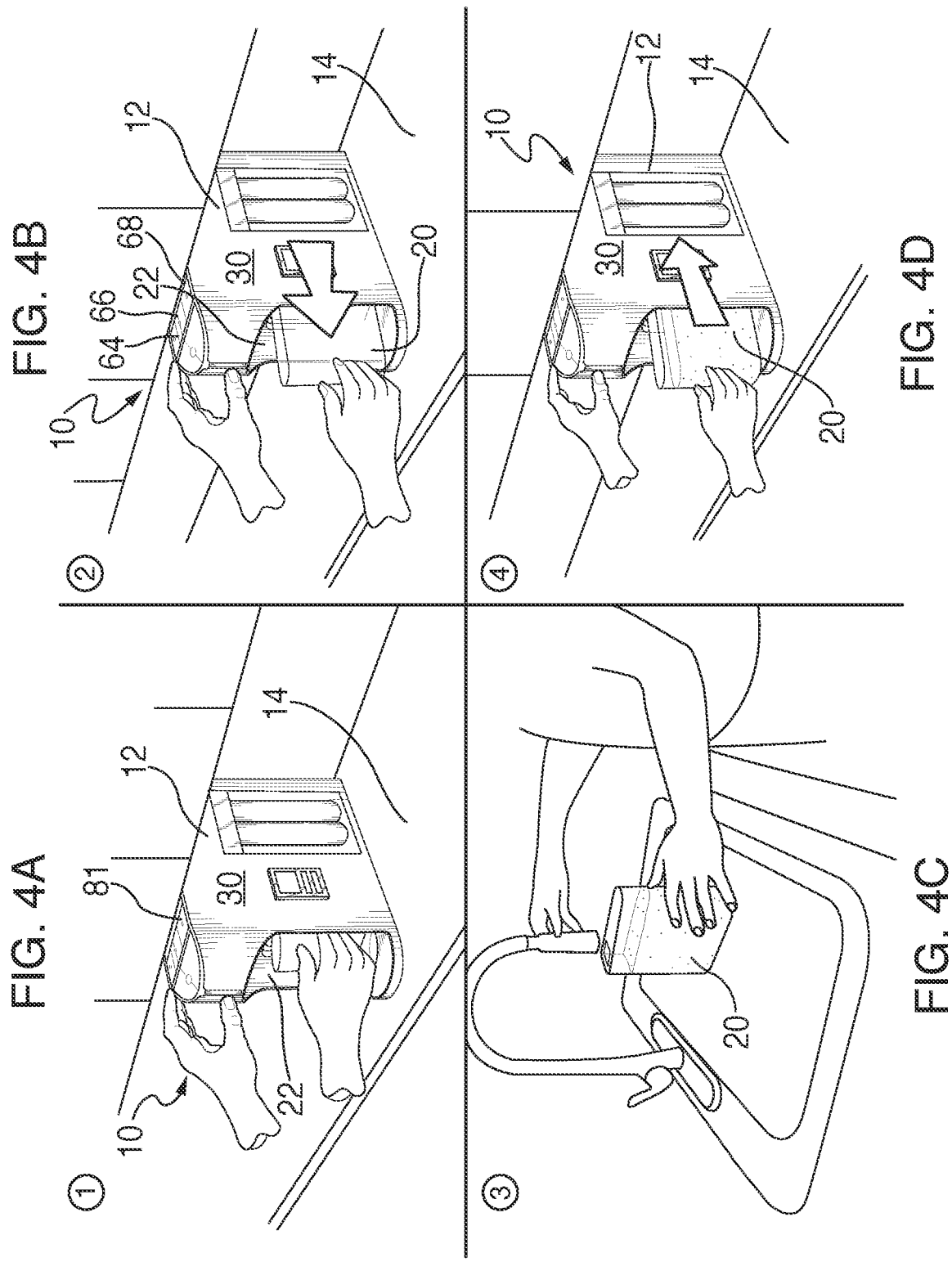
FIGS. 4A-D are sequential perspective views of the insertion and removal of the water receiving tank or container into the present system.

Referring now to FIGS. 4A-D, the process of user withdrawal and refilling of the receiving tank 20 is shown. First, the user withdraws the empty receiving tank 20 (FIGS. 4A, 4B). Next, the user refills the receiving tank 20 with tap water (FIG. 4C). Lastly, at FIG. 4D, the user replaces the filled receiving tank 20 into the housing 12.

Figure 6:
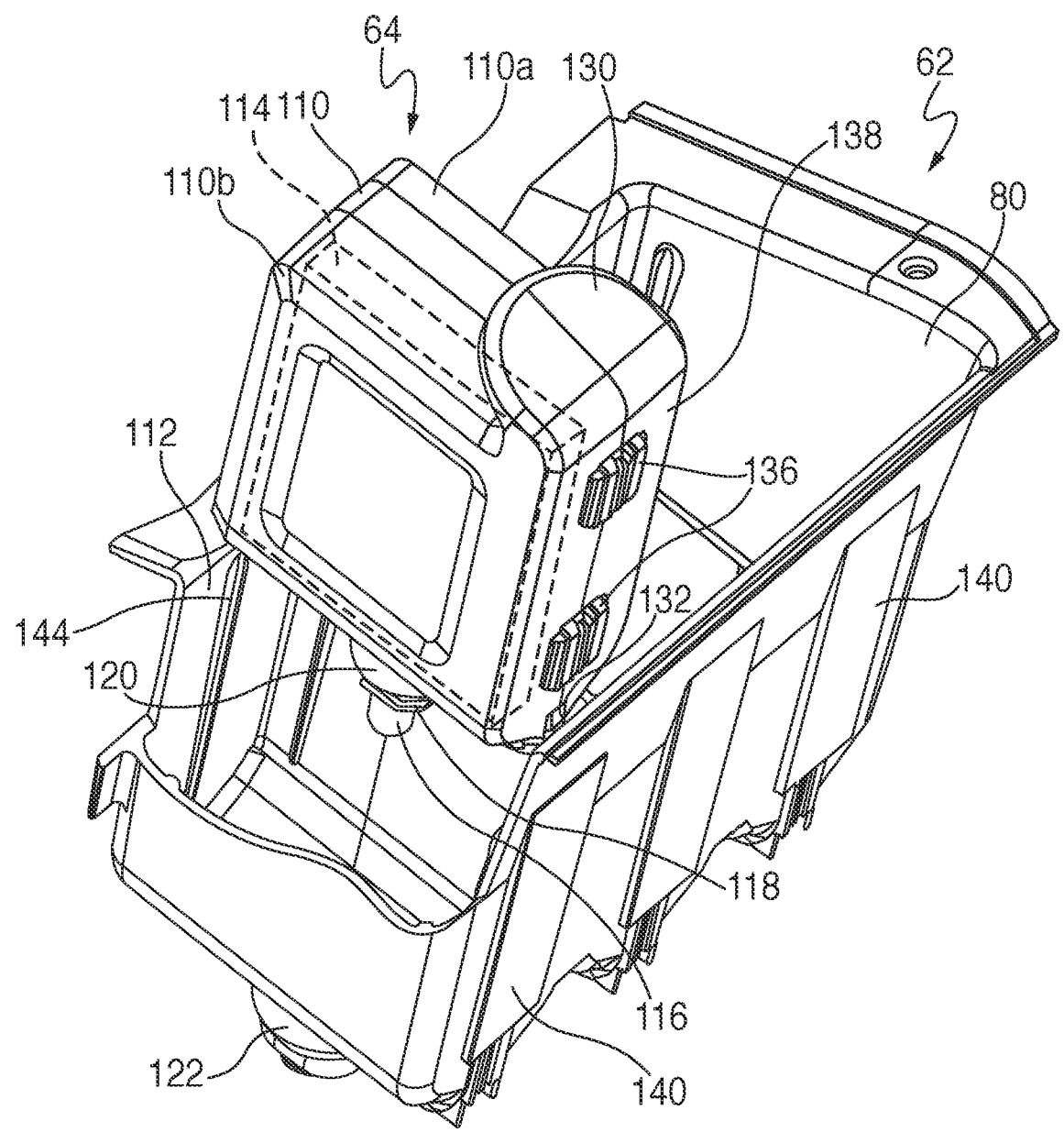
FIG. 6 is a fragmentary enlarged view of the insertion of the additive cartridge into the housing of the system.
Figure 7:
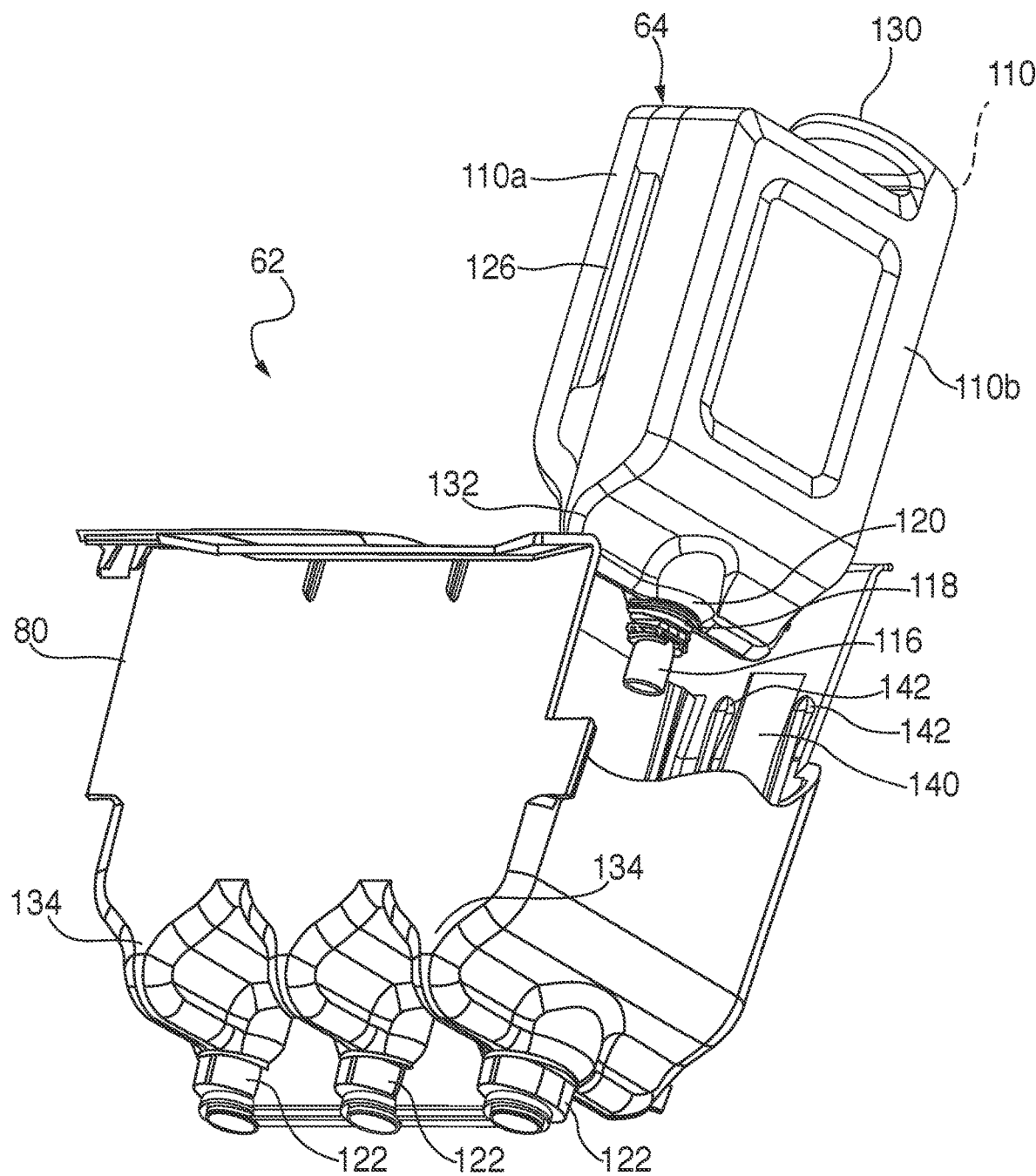
FIG. 7 is a bottom perspective view of the structure of FIG. 6.
Figure 8:
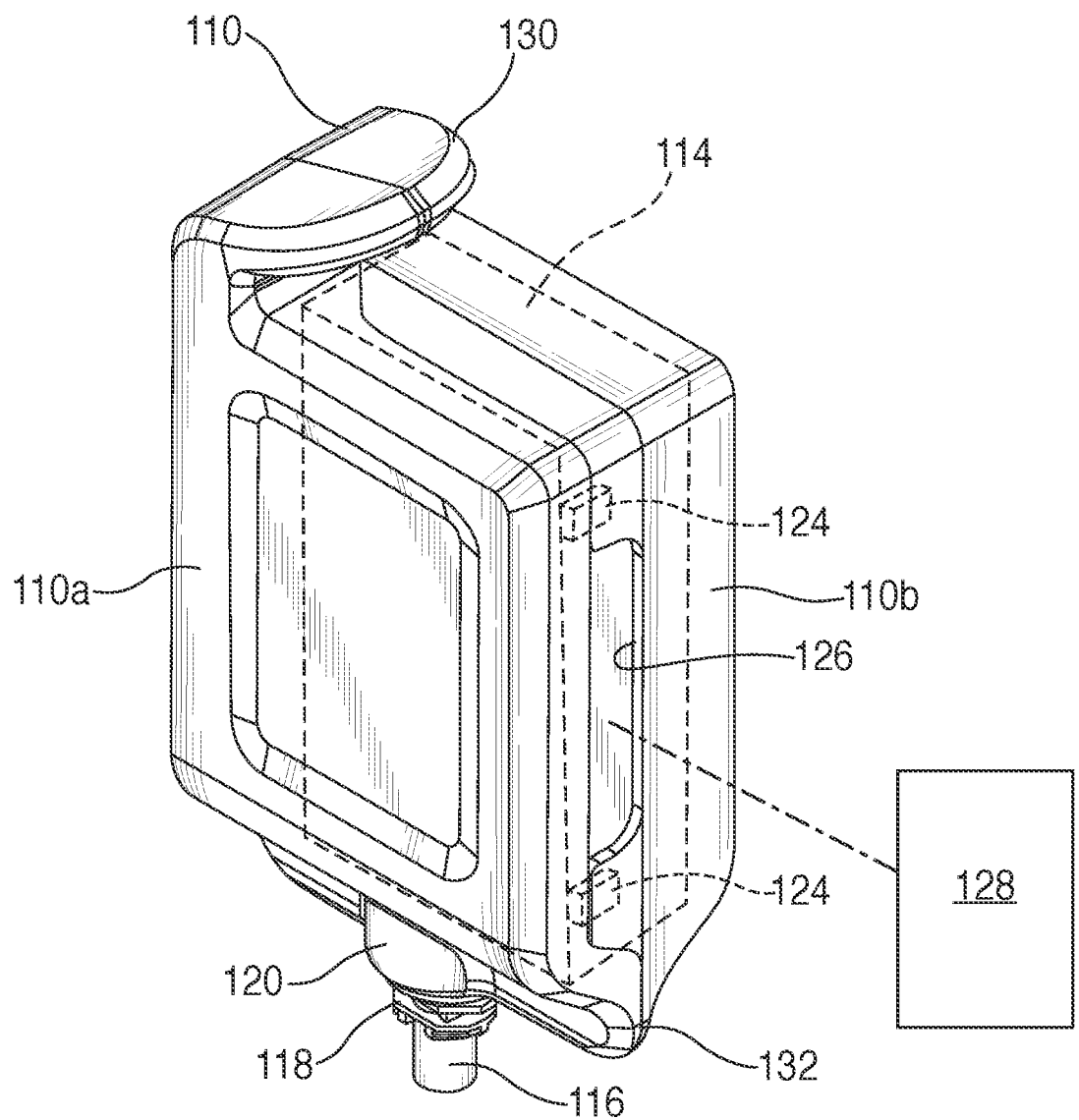
FIG. 8 is a top perspective view of the present additive cartridge.

Referring now to FIGS. 6-8, the additive cartridge 64-68 is described in greater detail. Since the cartridge itself is identical regardless of the enclosed additive, only the cartridge 64 will be discussed below. In this embodiment, the additive cartridge 64 is a rigid cassette 110 which is removably mounted in a designated receptacle 112 in the recess 80 in the additive module 62 located in the housing 12. Having a hinged or clam-shell configuration, the cassette 110 is easily openable by the user, and accommodates a disposable additive pouch 114 (shown hidden) made of a flexible material and including a rigid outlet or spout 116 with a collar 118. An outlet formation 120 on the cassette 110 clamps and locks the spout 116, specifically on the collar 118 in place and enhances alignment of the spout with an intake port 122 in the receptacle 112.

Once the pouch 114 is enclosed in the cassette 110 and the spout 116 locked in place at the outlet formation 120, the cassette is prevented from rotating in the cassette. The rigid construction of the cassette 110 prevents unwanted squeezing of the pouch 114, and allows for free flow of pouch contents into the treated water supply.

In one embodiment, magnets 124 (FIG. 8, shown hidden) in opposing locations on opposing clamshell halves 110a, 110b of the cassette 110 are used to hold the cassette in a closed position. It is also preferred for the cassette 110 and the corresponding receptacle 112 to emit a tactile and/or audible indication that the cassette is properly seated in the additive module. Another feature of the cassette 110 is an elongate slot 126 that can be used to facilitate a user opening the cassette to exchange pouches 114. Another use of the slot 126 is for enabling the user to visually monitor the level of contents in the pouch 114 when the pouch is made of transparent or translucent material. Referring to FIG. 8, as a further option, the cassette 110 is equipped with an optical sensor or RFID tag 128 for monitoring the contents of the pouch 114. The sensor 128 is wirelessly connected to the processor P to monitor the working life of the pouch 114, indicate when the pouch is empty, and/or indicates to the UI 82 on the display 84 that the cassette 110 is in the designated receptacle 112 in the additive module 62.

Opposite the outlet formation 120, the cassette 110 is preferably provided with a pull handle 130 for extracting the cassette from the additive module 62. In one embodiment, the handle 130 is integrally formed with the cassette 110, however other configurations are contemplated, including attachment with fasteners or adhesive. Nearer the outlet formation 120, a lower end 132 of the cassette is tapered for complementary or mating engagement with a narrowed portion 134 of the receptacle 112.

Hinges 136 on the cassette 110 preferably project from an end surface 138 and engage a recessed hinge clearance channel 140 in the receptacle 112 to ensure that the cassette is properly inserted in the receptacle. Projecting externally from the receptacle 112, the hinge clearance channel 140 define a recess in the interior of the receptacle. Also, elongate guide ribs 142 (FIG. 7) projecting into the receptacle 112 facilitate sliding insertion, guidance, proper location and retrieval of the cassette 110 from the receptacle. A blocking rib 144 (FIG. 6) opposite the guide ribs 142 projects into the receptacle 112 and prevents the cassette 110 from being inserted in an inverted manner, since the rib 144 blocks movement of the hinges 136 into the receptacle.

Figure 9:
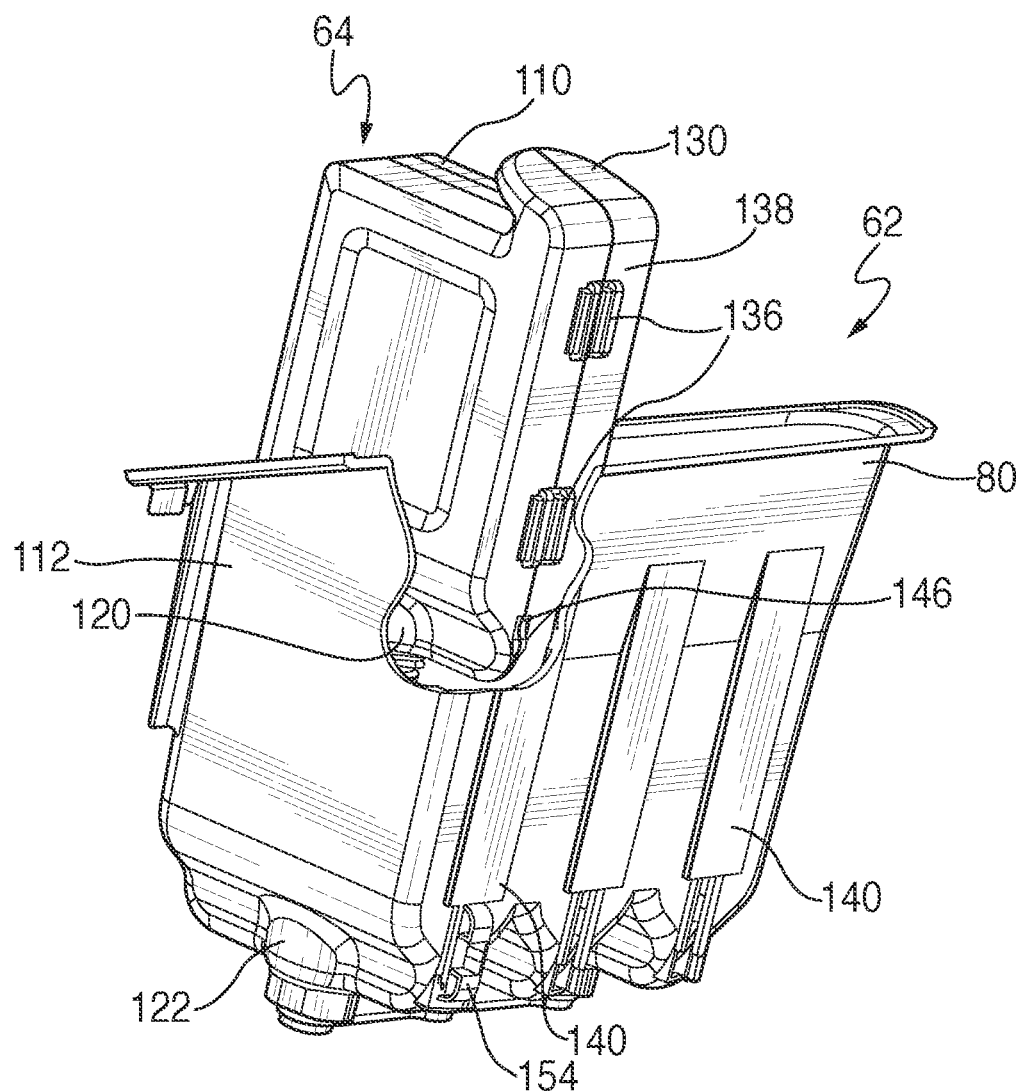
FIG. 9 is a fragmentary perspective view of insertion of the additive cartridge into the housing.
Figure 10:
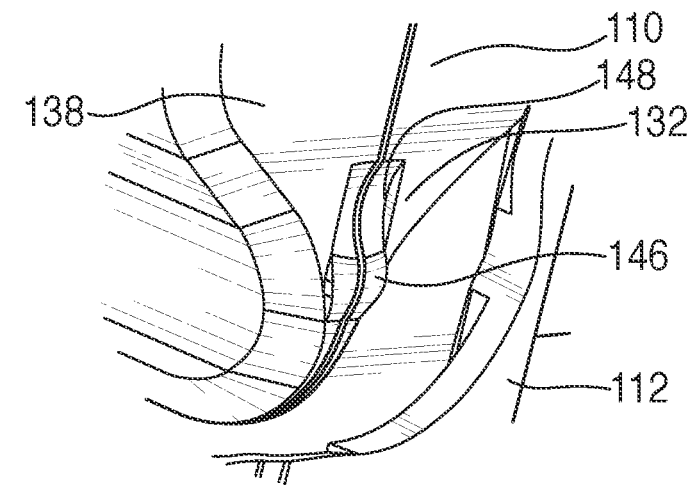
FIG. 10 is an enlarged fragmentary view of the structure of FIG. 9.

Referring now to FIGS. 2, 9 and 11, another feature of the present drink formulating system 10 which is especially applicable when provided in a counter-top configuration, is that the additive cassettes 110 are engageable in the designated receptacles 112 at a desired inclined angular orientation "α" that facilitates insertion/removal of the cassettes from the additive module 62, especially when the housing 12 is placed partly under a shelf or cabinets on the counter-top 14. In a preferred embodiment, the angle of orientation "α" is generally in the range of 60-70°. In a further preferred embodiment, the angle of orientation "α" is 62.5°, and it is contemplated that the angle may vary to suit the application.

Referring now to FIGS. 9-12, to further enhance the user sensation and confirmation that the cassette 110 is properly located in the receptacle 112, the cassette is preferably provided with an outwardly extending projection 146 at a relatively lower point on the narrowed end 132 and preferably on the end surface 138 below the hinges 136. In this discussion "lower" refers to farther away from the pull handle 130, preferably located on an upper end of the cassette 110. Just above the projection 146 is a recess 148 dimensioned to accommodate a spring ball 150 (FIGS. 11 and 12) that is located in the receptacle 112 below the hinge clearance channel 140. As seen in FIGS. 11 and 12, the spring ball 150 is located on a preferably metallic springing platform or plate 152 that is securely held in a spring ball insert 154 that clips into or is otherwise secured, as by fasteners, in the receptacle 112. In operation, as the cassette 110 is inserted into the receptacle, as the lower end 132 reaches the spring ball insert 154, the projection 146 temporarily depresses the spring ball 150 and the spring ball plate 152. Then, as the cassette 110 is fully seated in the receptacle, the pressure of the projection 146 is removed, and the inherent spring force of the platform 152 causes the spring ball 150 to resume the rest position accommodated by the recess 148. This action results in an audible and/or tactile sensation to the user that the cassette 110 is properly seated in the receptacle 112.

Figure 13:
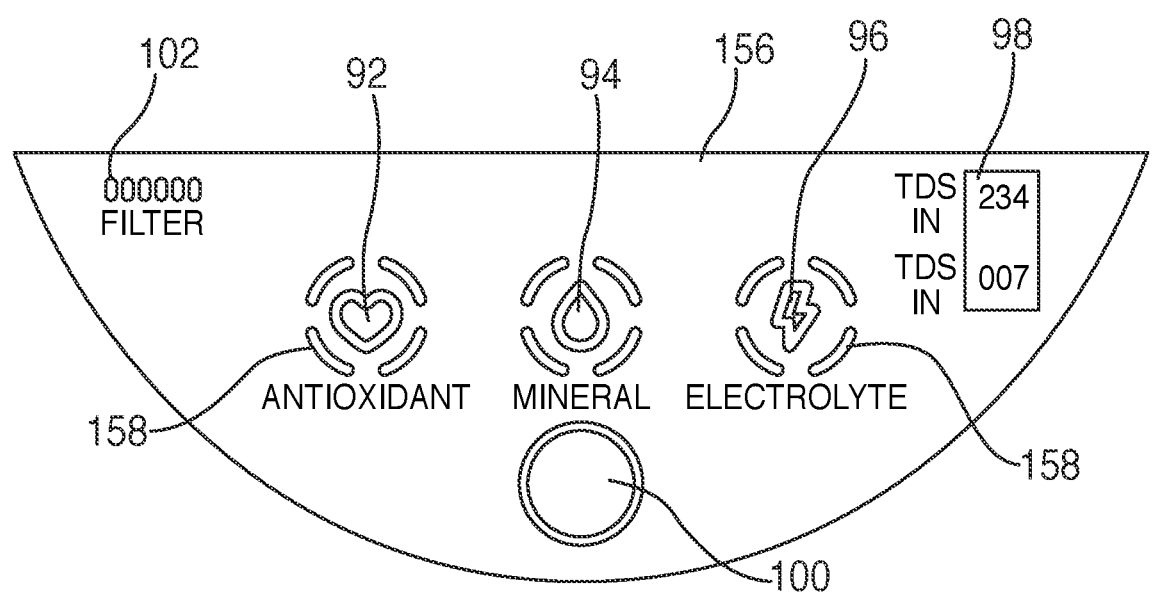
FIG. 13 is a schematic view of the present User Interface (UI)

Referring now to FIG. 13, a modification of the UI is designated 156. Features shared with the UI 82 are represented with identical reference numbers. UI 156 mainly provides an updated presentation for the various icons. For example, icons 92, 94, 96 represent the various additive cartridges 64, 66, 68, each surrounded by a plurality of arcuately spaced working life arcs 158. These icons 92-96 preferably have a shape indicative of the function of the icon, for example a "heart" shape 92 being indicative of a health additive, a lightning bolt 96 being indicative of enhanced energy, and the like. When the additive pouches 114 are full, the life arcs 158 are all fully illuminated. As the pouch 114 is depleted in each cassette 110, the arcs 158 sequentially dim until only the central icon 92, 94, 96 is visible. Then, when the pouch 114 is empty, the central icon 92, 94, 96 optionally intermittently flashes and/or changes color on the display 156. Optionally, the working life arcs 158 are replaced by a line of illuminated level markers in spaced parallel arrangement, visible on the display screen 156. Similar icons are contemplated for displaying the life of the DI cartridge 28 and the carbon filter cartridge 36.

In addition, the supplemental display field 98 of the UI 156 preferably includes a TDS IN and TDS OUT display to indicate to the user the need to change the deionization (DI) filter cartridge. TDS IN refers to the TDS of the incoming untreated water, and TDS OUT refers to the TDS of the water after treatment by the present system. Once the TDS OUT exceeds a preset level, for example 30 ppm, which may vary to suit the application, the UI displays an alarm icon, such as a flashing TDS OUT, and/or an additional display such as CHG, indicating to the user to change the DI filter cartridge. The field 100 optionally serves as a dispense button, and the field 102 optionally displays life of the various filters 28, 36.

Referring again to FIG. 5, another feature of the present drink formulating system 10 is that it is important to ensure that Total Dissolved Solids (TDS) is significantly reduced to at or near 0 at the end of the filtration steps. To this end, the first TDS sensor or probe 38' is located in a water line 39 just upstream of the first filter 28 and measures the initial TDS of the incoming, untreated water. The second TDS sensor or probe 38 is located after the first filter 28 of the two filters (DI and carbon) and is constructed and arranged to confirm that significantly reduced to at or near 0 TDS has been achieved in the filtering process. As a further quality control step, the third TDS sensor or probe 78 is preferably placed downstream of the last additive cassette location. This third TDS sensor or probe 78 confirms that TDS has reached the desired levels after addition of the additives. In one embodiment, the control system or processor P is programmed to compute the difference between the second and third TDS meter readings, and confirm that the treated water has the desired TDS level. Advantages of the quality control aspect of the third TDS sensor 78 include detection of the use of a foreign additive pouch, the additive pouch 114 is incorrectly mounted in the system 10, the additive pouch is out of specification, and or is depleted and is no longer altering the water. Regarding the DI filter 28, after the useful life of the cartridge it will quickly rise until there is no change in TDS when compared before and after the cartridge. Also the device will alert the user to change the cartridge after the second TDS meter reads above 30 ppm TDS.

Figure 14:
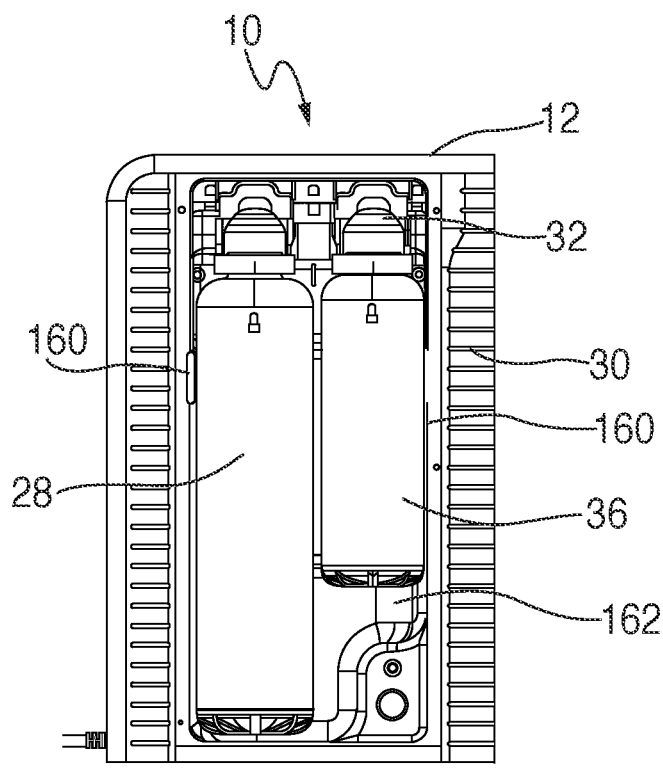
FIG. 14 is a fragmentary elevation of the present housing showing cartridge mounting.
Figure 15:
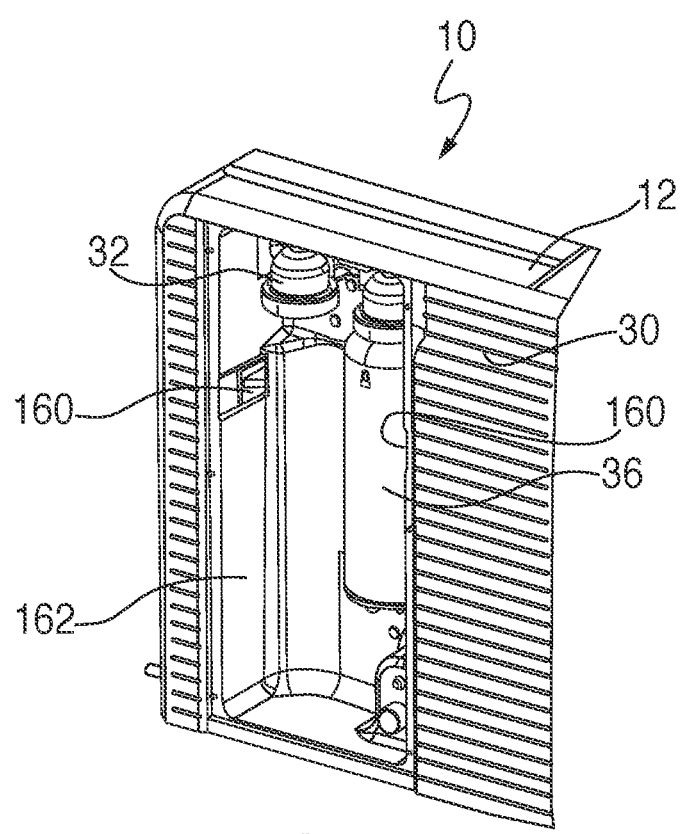
FIG. 15 is a fragmentary top perspective view of the structure of FIG. 14 with one cartridge missing.
Figure 16:
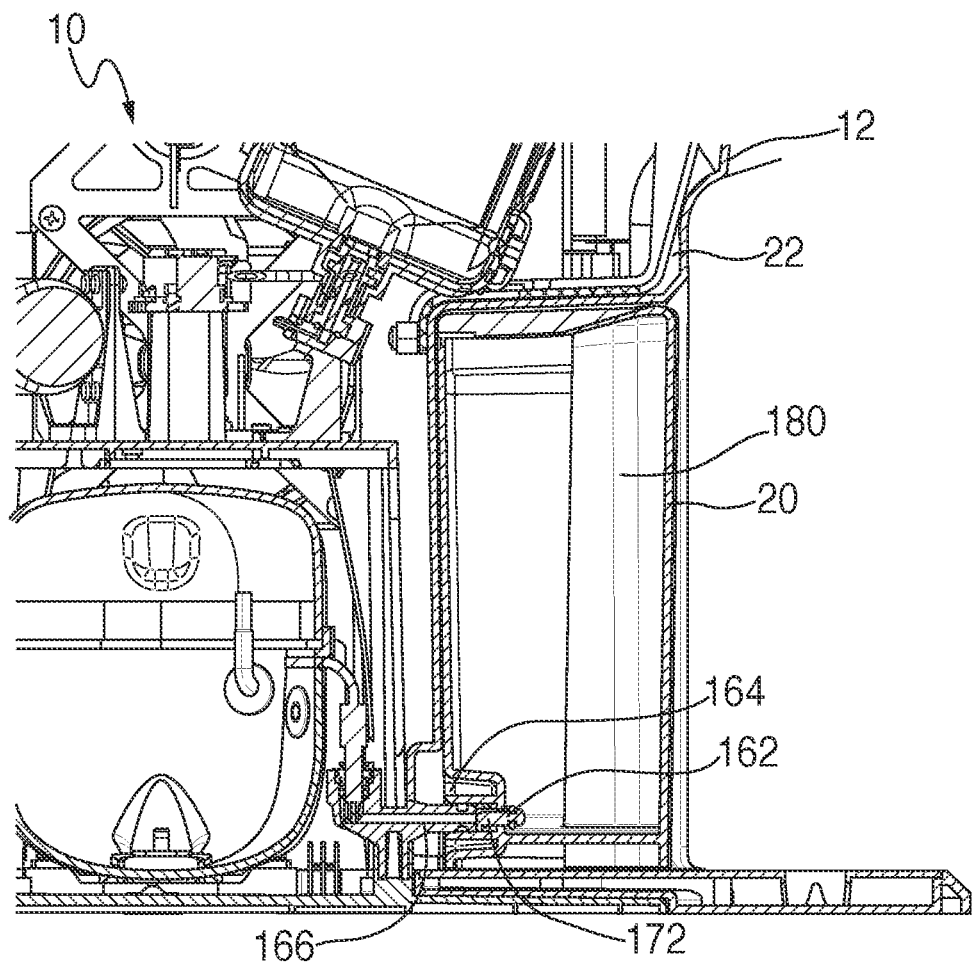
FIG. 16 is a fragmentary vertical section of the present housing.

Referring now to FIGS. 1 and 14 and 15, the side 30 of the housing 12 is depicted in greater detail. It is preferred that the system 10 include an alert for the user that one or more of the cartridges 28, 36 is absent, in which case the system, through the processor P, will fail to dispense water from the outlet 16 in the absence of a filter cartridge in the housing 12. To this end, a pair of presence switches 160 is located in a cavity 162 in the side 30 of the housing 12 in a position such that each switch is closed upon each of the cartridges 28, 36 being correctly connected to the filter head 32. Upon removal of one or both of the cartridges, 28, 36, the respective presence switch 160 will open, breaking the circuit and causing the processor P to discontinue dispensing water from the outlet 16.

In one embodiment of the present drink formulating system 10, the control unit or processor P adjusts additive flow rate as a function of water flow rate, to maintain a desired concentration of additive in the treated water.

Referring now to FIGS. 5 and 16-19, another feature of the present drink formulating system 10 is that the receiving tank 20 is releasably engageable in the cavity 22 in the housing 12 using a spring-loaded check valve 162 that accommodates horizontal reciprocal action of the receiving tank. More specifically, as the full receiving tank 20 is pushed into the cavity 22, a receiving inlet port 164 on the receiving tank has the internal spring-loaded check valve 162 that is biased to a closed/sealed position. A laterally-extending connector fitting 166 is aligned with, matingly engages the inlet port 164, and is dimensioned to open the check valve 162 as the receiving tank 20 is pressed into place.

The connector fitting 166 is in fluid communication with the pump inlet 26 seen in FIG. 5 and is preferably provided with an O-ring seal 168 to prevent leakage as the receiving tank 20 is installed in the cavity 22. Similarly, the check valve 162 is also provided with an O-ring seal 170 located on the horizontally-reciprocating stem 172 for sealing the receiving tank 20 once it is removed from the cavity 22.

Figure 17:
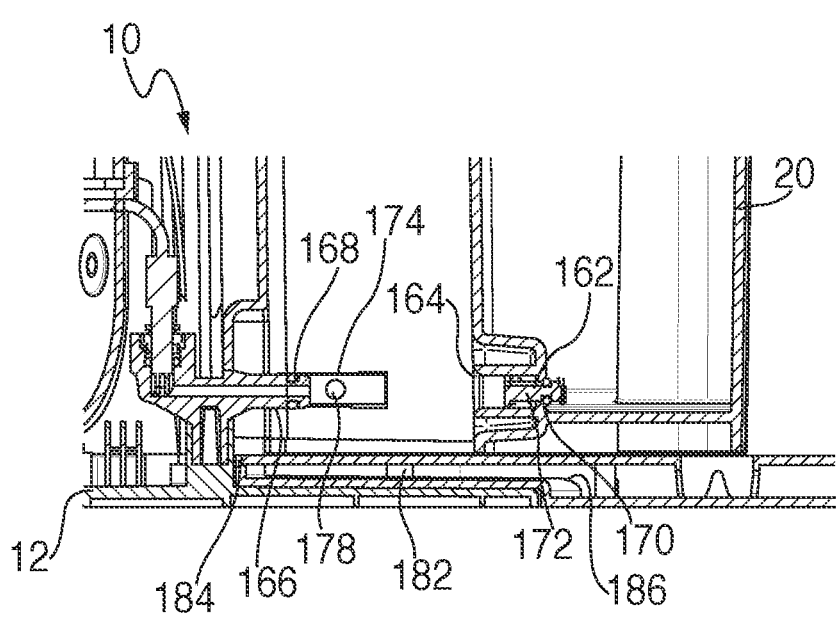
FIG. 17 is an enlarged fragmentary view of the structure of FIG. 16.
Figure 18:
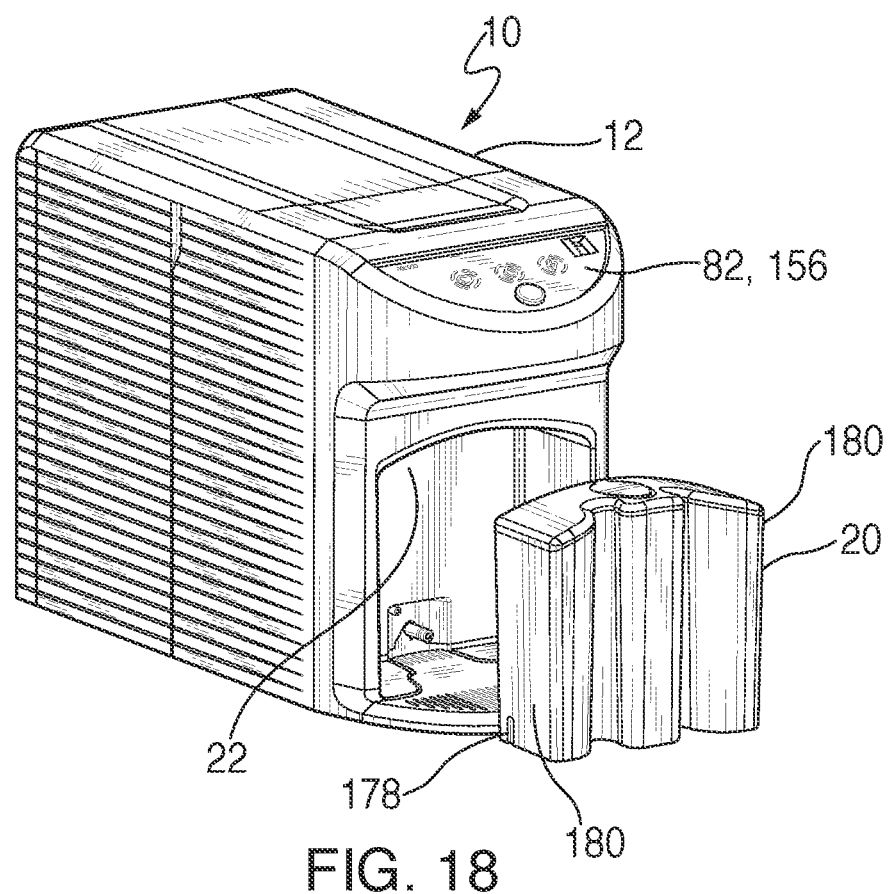
FIG. 18 is an exploded front perspective view of the present housing.
Figure 19:
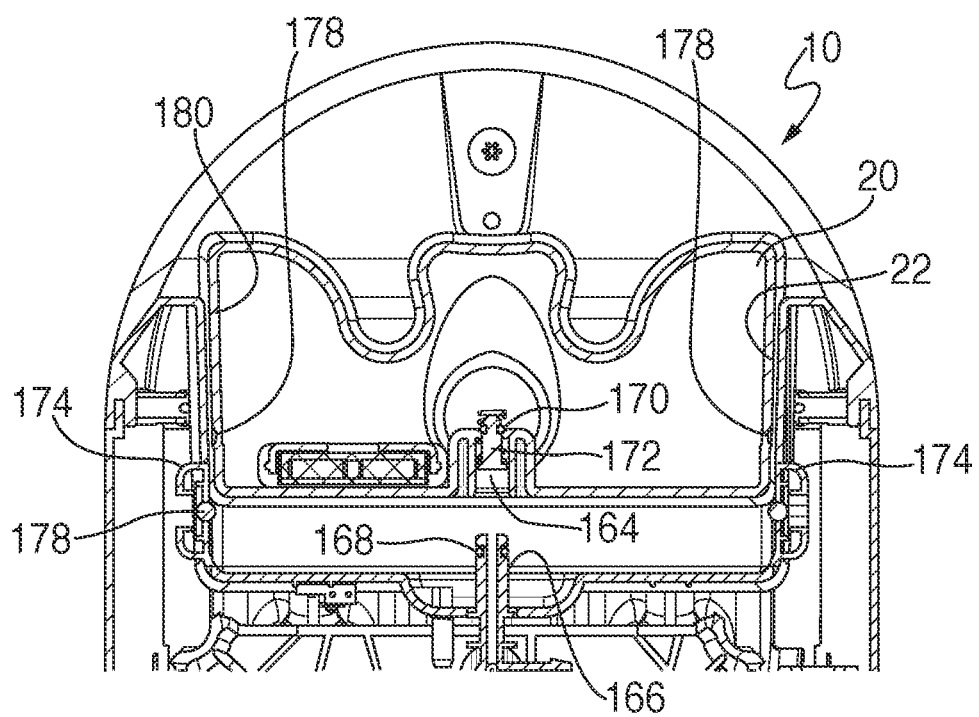
FIG. 19 is a fragmentary top view of the structure of FIG. 18 with the receiving tank shown installed.

It is preferred that the user be provided with an audible/tactile indication that the receiving tank 20 is properly engaged in the cavity 22. To this end, and similar to the cassette 110 described above, the cavity 22 is provided with at least one, and preferably a pair of spring ball inserts 174 similar to the inserts 154 described above. Biased spring balls 176 engage detents 178 in the receiving tank 20, preferably located on sidewalls 180 of the receiving tank to create a desired audible/tactile sensation to the user that the receiving tank 20 is properly engaged in the cavity 22. As seen in FIG. 17, in the preferred embodiment, the spring-ball inserts 174 are generally horizontally aligned with the check valve 162, however other configurations are contemplated in which such alignment is lacking.

Referring again to FIG. 17, in the event any water spills are created during the process of installing and/or removing the receiving tank 20, the cavity 22 is provided with a removable drip tray 182 having openings 184 in communication with a lower drip storage chamber 186 for catching any stray water for later removal by the user.

Figure 20:
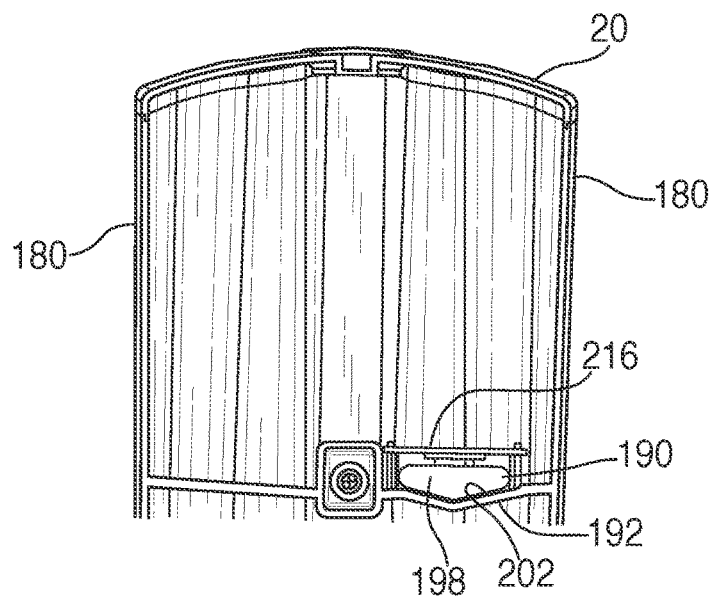
FIG. 20 is a fragmentary interior front view of the present receiving tank.
Figure 21:
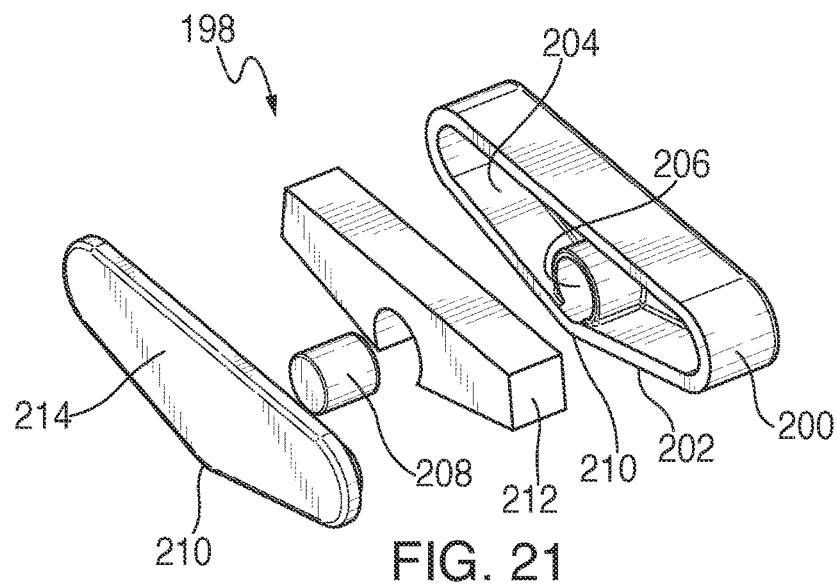
FIG. 21 is an exploded perspective view of the present receiving tank float switch.
Figure 22:
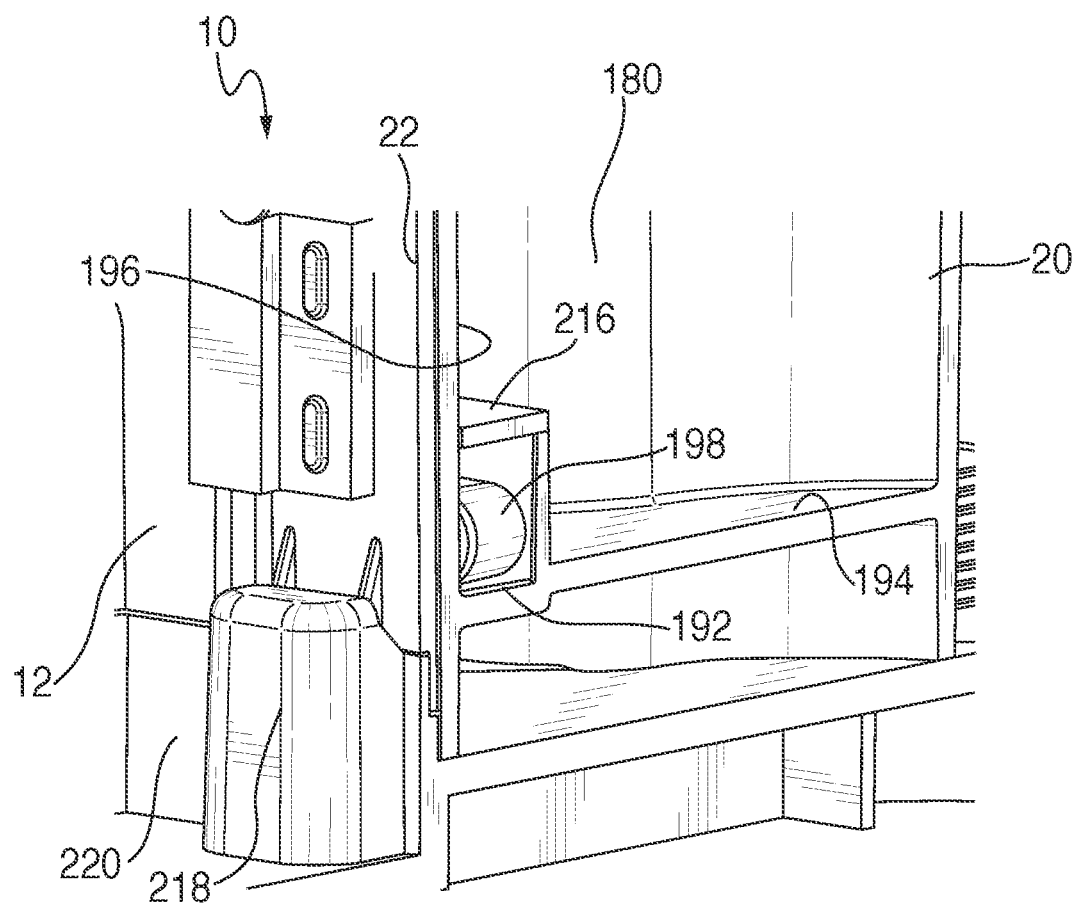
FIG. 22 is a fragmentary exploded view of the structure of FIG. 20.

Referring now to FIGS. 20-22, another feature of the present drink formulating system 10 is that the receiving tank 20 has a level switch 190 that is configured to monitor when the tank is virtually empty. As such, the level switch 190 includes a notched cradle 192 integrally molded, ultrasonically welded or otherwise fixed near a floor 194 of the tank 20. While other locations within the receiving tank 20 are contemplated, in the preferred embodiment, the cradle 192 is located against an inside rear wall 196 of the tank. A float element 198 is dimensioned to matingly nest in the cradle 192 so that when nested, the element is only slightly above the tank floor 194.

More specifically, as seen in FIG. 21, the float element 198 has a float housing 200 generally pointed or "V"-shaped lower end 202. An inner float chamber 204 is defined by the housing 200, and includes a magnet retention socket 206 for accommodating a magnet 208. In the preferred embodiment, the magnet retention socket 206 is located adjacent an apex 210 of the lower end 202, however other locations are contemplated. It is preferred that the magnet 208 be located as close to the floor 194 of the receiving tank 20 as possible.

Surrounding the magnet retention socket 206 is a float member 212, preferably made of buoyant foam or the like. As seen in FIG. 21, the float member 212 is constructed and arranged for placement within the float chamber 204. A float cap 214 is affixed to the float housing 200 by chemical adhesives, ultrasonic welding or suitable fasteners, and seals the magnet 208 and the float member 212 within the float housing 200.

Referring now to FIG. 22, when the receiving tank 20 has an ample amount of water, the float element 198 floats upward and abuts a roof 216 of the cradle 192, the cradle being partially open or in fluid communication with the water in the tank. As the water level lowers in the receiving tank 20 to the extent that the float element 198 is no longer buoyant in the cradle 192, the float element seats in the cradle 192 so that the magnet 208 is close to the tank floor 194. A magnetic sensor 218, such as a Hall Effect sensor or the like, is located on an inner wall 220 of the cavity 22 in operational proximity to the cradle 192. Once the magnet 208 is seated in the cradle 192, indicating that the receiving tank 20 is substantially empty, a signal is generated by the sensor 218 which is transmitted to the processor P and then a display 156 generated on the UI to alert the user to refill the tank. In addition, processor P is configured so that no further treated water will be emitted from the outlet 16 when the receiving tank 20 is empty.

While a particular embodiment of the present home water-based drink formulating system has been described herein, it will be appreciated by those skilled in the art that changes and modifications may be made thereto without departing from the invention in its broader aspects and as set forth in the following claims.

The invention claimed is:

1. A drink formulating system, comprising:
a housing having an external surface, an internal surface, a cavity, and a housing outlet, said housing outlet disposed within said cavity of said housing, said cavity being formed by said external surface of said housing;
a receiving tank being removable from said cavity to receive untreated potable water poured by a user and configured to store said untreated potable water at an ambient temperature, said receiving tank being removably attached to said housing;
a pump associated with said housing, said pump being connected to said receiving tank and configured for pumping the untreated potable water from said receiving tank;
a first filter associated with said housing and being in fluid communication with said pump, said first filter configured for removing a first set of substances from the untreated potable water obtained from said receiving tank to create a first filtered water;
a second filter associated with said housing and being in fluid communication with said first filter so that the first filtered water is passed to said second filter, said second filter is constructed and arranged for removing a second set of substances different from the first set of substances from the first filtered water to create a second filtered water;
an outlet of said second filter being connected to an additive module having at least one additive cartridge, each said cartridge supplying a designated composition of an additive;
a chilling tank associated with said housing and having an inlet being accessible to receive the second filtered water at said ambient temperature;
a refrigeration apparatus having a cooling fan and associated with said housing and in direct contact with said chilling tank for reducing a temperature of the second filtered water stored within said chilling tank from said ambient temperature to a predetermined chilled temperature, creating a supply of chilled water; and
a user-controlled interface connected to said additive module and configured for user selection of one of said designated compositions of additives, which are then dosed into said chilled water sourced from said chilling tank to create a dispensing water that is distributed from said housing outlet for user consumption.

2. The system of claim 1, wherein said first filter is constructed and arranged as a deionizing filter for removing salts and minerals from the untreated potable water in said receiving tank.

3. The system of claim 2, wherein said first filter is provided with a supply of ion exchange resin beads for withdrawing charged particles and minerals in the untreated potable water.

4. The system of claim 1, wherein said second filter is constructed and arranged as a Submicron carbon filter for removing heavy metals, VOCs, chlorine, particulates, pharmaceuticals and microbial contaminants in the first filtered water.

5. The system of claim 1, wherein after treatment by said second filter, the second filtered water has a Total Dissolved Solids (TDS) value of approximately 0.

6. The system of claim 1, wherein one of said additive cartridges is formulated for Sport Drink enhancement, and includes predetermined amounts of elements taken from the group consisting of calcium, sodium, potassium, magnesium and Vitamin C.

7. The system of claim 6, wherein a concentration of said elements in said cartridge creates a beverage of approximately 2000 ppm concentration of said additive.

8. The system of claim 1, further including at least one sensor operatively connected to components of said system and to said user interface for sensing at least one of a receiving tank water level, said predetermined chilled temperature, a chilling tank water level, a water conductivity, and a water flow rate.

9. The system of claim 1, further including at least one solenoid valve connected to said user interface for directing water flow in said system.

10. The system of claim 1, further including a micro peristaltic dosing pump in said additive module, associated with each said at least one additive cartridge and connected to said user interface for providing designated amounts of said additive to the chilled water.

11. The system of claim 10, wherein each said dosing pump operates to achieve a dosing ratio of said additive in said at least one additive cartridge to a chilled water flow of from 1:200 to 1:50.

12. The system of claim 1, wherein said user interface has functions for the user to monitor and/or control the predetermined chilled temperature, working life of said first and second filters, water level in said chilling tank, water level in said receiving tank, a selected additive cartridge, working life of said at least one additive cartridge, or that said at least one additive cartridge is bypassed.

13. The system of claim 1 wherein each said additive cartridge is provided in the form of a rigid cassette which is replaceably mounted in a designated receptacle in the additive module located in the housing, having a clamshell construction releasably enclosing a flexible additive pouch and having an outlet formation engaging a spout of the pouch.

14. The system of claim 13 wherein said cassette is provided with a detent formation for emitting at least one of a tactile and audible indication upon the cassette engaging a corresponding said designated receptacle in said housing.

15. The system of claim 13 wherein said designated receptacle in said housing is constructed and arranged to accommodate said at least one cassette at a designated inclined angle.

16. The system of claim 13 wherein said at least one cassette and said receptacle are provided with mating engagement formations for alignment of said at least one cassette in said receptacle.

17. The system of claim 1 wherein said user interface employs illuminated icons, including a shape icon indicative of a function of the icon, and the icon being surrounded by a ring of spaced, illuminated secondary icons, so that the illumination of the secondary icons as well as the shape icon itself is indicative of a level of additive in said at least one additive cartridge.

18. The system of claim 5, further including a first TDS meter located upstream of said first filter for measuring an initial TDS of the untreated potable water; a second TDS meter located downstream of said first filter and constructed and arranged to measure and confirm that a second TDS is at or near 0; and a third TDS meter located downstream of the last additive cassette location for confirming that a third TDS of a treated water has reached a predetermined level after addition of the additives.

19. The system of claim 1, wherein said receiving tank has a level switch that is configured to monitor a receiving tank water level, and includes a notched cradle fixed near a floor of the receiving tank; and a float element is dimensioned to matingly nest in the notched cradle so that when nested, the float element is positioned adjacent to a receiving tank floor.

20. A drink formulating system, comprising:
a housing having an external surface, an internal surface, a cavity, and a housing outlet, said housing outlet disposed within a cavity of said housing, said cavity being formed by said external surface of said housing;
a receiving tank being removable from said cavity to receive untreated potable water poured by a user;
a pump associated with said housing, said pump being connected to said receiving tank and configured for pumping said untreated potable water from said receiving tank;
a first filter is in fluid communication with the pump for removing a first set of substances from the untreated potable water to create a first filtered water;
a second filter associated with said housing and being in fluid communication with said first filter so that the first filtered water is passed to said second filter, said second filter is constructed and arranged for removing a second set of substances different from the first set of substances from the first filtered water to create a second filtered water;
an additive module is connected to an outlet of said first filter and has at least two additive cartridges, each said cartridge supplying a designated composition of an additive;
a user-controlled interface allows for user selection of one of the designated additive compositions, which are then dosed using designated dosing pumps into chilled water from a chilling tank to create dispensing water that is distributed from said housing outlet for user consumption, and user selection of dispensing water temperature; and
a first TDS meter located upstream of said first filter for measuring an initial TDS of the untreated potable water; a second TDS meter located downstream of said first filter and is constructed and arranged to measure and confirm that a second TDS is at or near 0; and a third TDS meter located downstream of said additive module for confirming that a third TDS of a treated water has reached a predetermined level after addition of the additives
wherein said pump operably dispenses said dispensing water from said housing outlet when an ambient dispensing water temperature is selected on the user-controlled interface, and said chilled water pump operably dispenses said dispensing water from said housing outlet when a chilled dispensing water temperature is selected on the user-controlled interface.

* * * * *